United States Patent
Ebisawa et al.

(10) Patent No.: US 9,944,728 B2
(45) Date of Patent: Apr. 17, 2018

(54) PRODUCTION METHOD OF OLEFIN (CO)POLYMER CONTAINING CONSTITUENT UNIT DERIVED FROM 1-BUTENE

(71) Applicant: MITSUI CHEMICALS, INC., Tokyo (JP)

(72) Inventors: Ikuko Ebisawa, Chiba (JP); Masahiro Yamashita, Chiba (JP); Takashi Yukita, Chiba (JP); Junichi Mohri, Oamishirasato (JP); Junpei Tanaka, Sodegaura (JP); Noriko Kai, Otake (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/509,382

(22) PCT Filed: Sep. 10, 2015

(86) PCT No.: PCT/JP2015/075725
§ 371 (c)(1),
(2) Date: Mar. 7, 2017

(87) PCT Pub. No.: WO2016/039416
PCT Pub. Date: Mar. 17, 2016

(65) Prior Publication Data
US 2017/0275396 A1 Sep. 28, 2017

(30) Foreign Application Priority Data

Sep. 11, 2014 (JP) .................................. 2014-185380

(51) Int. Cl.
*C08F 210/08* (2006.01)
*C08F 10/08* (2006.01)
(Continued)

(52) U.S. Cl.
CPC .............. *C08F 10/08* (2013.01); *C08F 4/022* (2013.01); *C08F 4/6028* (2013.01); *C08F 10/02* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,892,851 A | 1/1990 | Ewen et al. | |
| 4,960,878 A | 10/1990 | Crapo et al. | |

(Continued)

FOREIGN PATENT DOCUMENTS

| | | |
|---|---|---|
| JP | H01- 501950 A | 7/1989 |
| JP | H01-502306 A | 7/1989 |

(Continued)

OTHER PUBLICATIONS

Kaminsky et al., Angewandte Chemie, A Journal of the Gesellschaft Deutscher Chemiker, Acieay 24 (6) pp. 439-528, ISSN 0570-0833, vol. 24, No. 6, Jun. 1985.

(Continued)

*Primary Examiner* — Richard A Huhn
(74) *Attorney, Agent, or Firm* — Foley & Lardner, LLP

(57) ABSTRACT

The purpose of the present invention is to provide a method for efficiently producing an olefin (co)polymer containing a constituent unit derived from 1-butene, the (co)polymer having a molecular weight that is sufficiently high even for high temperature conditions that are beneficial for industrial production methods. This purpose can be achieved by means of a method for producing an olefin (co)polymer containing a constituent unit derived from 1-butene, wherein at least 1-butene and, if necessary, an α-olefin having 2 or more carbon atoms (excluding 1-butene) and other monomers are (Continued)

(co)polymerized in the presence of an olefin polymerization catalyst that contains (A) a crosslinked metallocene compound represented by general formula [I] and (B) at least one type of compound selected from among (b-1) an organic aluminum oxy compound, (b-2) a compound that forms an ion pair upon a reaction with the crosslinked metallocene compound (A), and (b-3) an organic aluminum compound, at a polymerization temperature of 55-200° C. and a polymerization pressure of 0.1-5.0 MPaG.

25 Claims, 1 Drawing Sheet

(51) Int. Cl.
    *C08F 4/02* (2006.01)
    *C08F 4/602* (2006.01)
    *C08F 10/02* (2006.01)
    *C08F 4/64* (2006.01)
    *C08F 4/642* (2006.01)

(52) U.S. Cl.
    CPC ........ *C08F 4/64003* (2013.01); *C08F 4/6428* (2013.01); *C08F 210/08* (2013.01); *C08F 2420/03* (2013.01); *C08F 2800/10* (2013.01)

(56) References Cited

U.S. PATENT DOCUMENTS

| | | |
|---|---|---|
| 4,990,640 A | 2/1991 | Tsutsui et al. |
| 5,026,798 A | 6/1991 | Canich |
| 5,036,034 A | 7/1991 | Ewen |
| 5,041,584 A | 8/1991 | Crapo et al. |
| 5,055,438 A | 10/1991 | Canich |
| 5,057,475 A | 10/1991 | Canich et al. |
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,195,401 A | 3/1993 | Mouton |
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatky et al. |
| 5,243,001 A | 9/1993 | Winter et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | LaPointe |
| 5,334,677 A | 8/1994 | Razavi et al. |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,416,228 A | 5/1995 | Ewen et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,547,675 A | 8/1996 | Canich |
| 5,561,092 A | 10/1996 | Ewen et al. |
| 5,589,556 A | 12/1996 | Razavi |
| 5,599,761 A | 2/1997 | Turner |
| 5,614,457 A | 3/1997 | Ewen et al. |
| 5,621,126 A | 4/1997 | Canich et al. |
| 5,631,391 A | 5/1997 | Canich |
| 5,663,249 A | 9/1997 | Ewen et al. |
| 5,723,560 A | 3/1998 | Canich |
| 5,763,549 A | 6/1998 | Elder et al. |
| 5,801,113 A | 9/1998 | Jejelowo et al. |
| 5,807,939 A | 9/1998 | Elder et al. |
| 5,883,202 A | 3/1999 | Ewen et al. |
| 6,121,395 A | 9/2000 | Turner |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| 6,355,592 B1 | 3/2002 | Hlatky et al. |
| 6,369,175 B1 | 4/2002 | Ewen |
| 6,417,120 B1 | 7/2002 | Mitchler et al. |
| 6,423,795 B1 | 7/2002 | Canich et al. |
| 6,617,466 B1 | 9/2003 | Canich |
| 6,632,898 B1 | 10/2003 | Canich |
| 6,939,928 B1 | 9/2005 | Kawai et al. |
| 7,041,841 B1 | 5/2006 | Canich |
| 7,163,907 B1 | 1/2007 | Canich et al. |
| 7,569,646 B1 | 8/2009 | Canich |
| 2002/0155776 A1 | 10/2002 | Mitchler et al. |
| 2006/0052553 A1 | 3/2006 | Resconi et al. |
| 2006/0161013 A1 | 7/2006 | Tohi et al. |
| 2006/0178491 A1 | 8/2006 | Canich |
| 2008/0038498 A1 | 2/2008 | Itakura et al. |
| 2008/0220193 A1 | 9/2008 | Tohi et al. |
| 2015/0239996 A1* | 8/2015 | Funaya .................. C08F 10/00 526/127 |
| 2015/0252123 A1 | 9/2015 | Funaya |
| 2016/0280819 A1 | 9/2016 | Tohi et al. |
| 2016/0304640 A1 | 10/2016 | Funaya |
| 2016/0376385 A1 | 12/2016 | Funaya et al. |

FOREIGN PATENT DOCUMENTS

| | | |
|---|---|---|
| JP | H02-167305 A | 6/1990 |
| JP | H02-247201 A | 10/1990 |
| JP | H03-103407 A | 4/1991 |
| JP | H03-179005 A | 8/1991 |
| JP | H03-179006 | 8/1991 |
| JP | H03-193796 A | 8/1991 |
| JP | H03-207703 A | 9/1991 |
| JP | H03-207704 A | 9/1991 |
| JP | H04-268307 A | 9/1992 |
| JP | H06-122718 A | 5/1994 |
| JP | H08-225605 A | 9/1996 |
| JP | 2000-212194 A | 8/2000 |
| JP | 2004-051676 A | 2/2004 |
| JP | 2004-161957 A | 6/2004 |
| JP | 2004-168744 A | 6/2004 |
| JP | 2004-189666 A | 7/2004 |
| JP | 2006-509059 A | 3/2006 |
| JP | 2007-302853 A | 11/2007 |
| JP | 2007-302854 A | 11/2007 |
| WO | WO 01/27124 A1 | 4/2001 |
| WO | WO 2016/068308 A1 | 6/2006 |
| WO | WO 2014/050816 A | 4/2014 |
| WO | WO 2014/050817 A1 | 4/2014 |
| WO | WO-2014050817 A1 * | 4/2014 ............ C08F 10/00 |

OTHER PUBLICATIONS

Journal of the American Chemical Society, pp. 6255-6256, vol. 110, No. 18, Aug. 31, 1988.
Macromolecular Chemistry and Physics, 207, pp. 2257-2279, Sep. 21, 2006.
Macromolecules, vol. 10, No. 4, Jul./Aug. 1977.
Macromolecules, 37, pp. 2471-2477, Feb. 6, 2004.

* cited by examiner

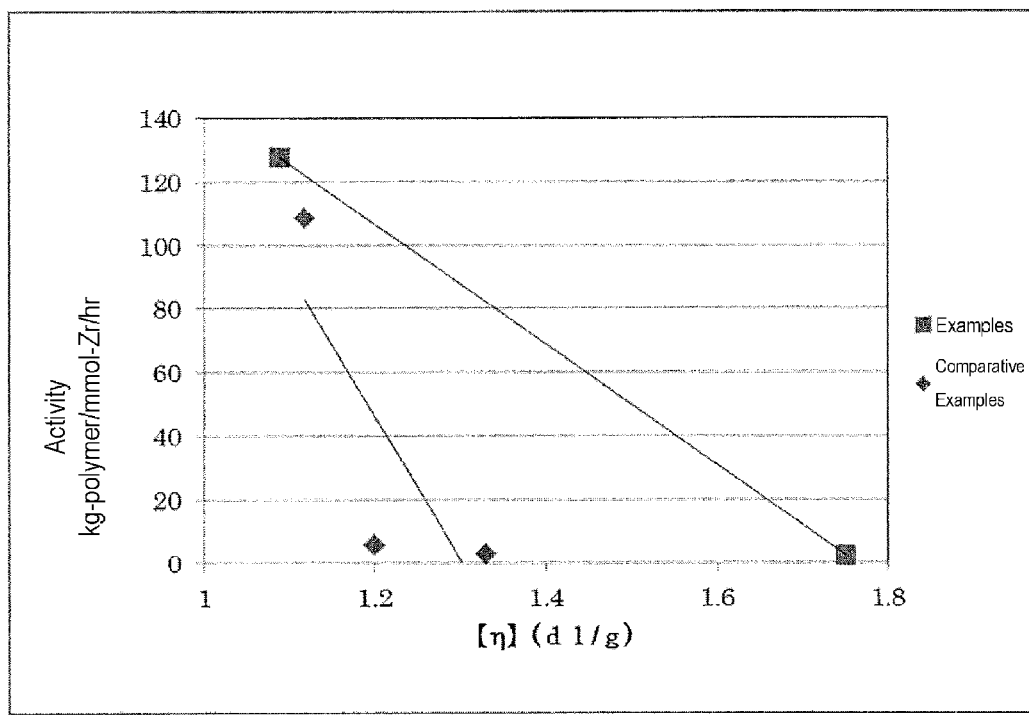

US 9,944,728 B2

PRODUCTION METHOD OF OLEFIN (CO)POLYMER CONTAINING CONSTITUENT UNIT DERIVED FROM 1-BUTENE

CROSS-REFERENCE TO RELATED APPLICATIONS

The present application is a U.S. national stage application of International Patent Application No. PCT/JP2015/075725, filed Sep. 10, 2015, which claims the benefit of priority to Japanese Patent Application No. 2014-185380, filed Sep. 11, 2014, the entireties of which are hereby incorporated by reference.

TECHNICAL FIELD

The present invention relates to a production method of an olefin (co)polymer containing structural units derived from 1-butene.

BACKGROUND ART

In recent years, metallocene compounds have been known as homogeneous catalysts for olefin polymerization. With regard to methods for polymerizing olefins (in particular, methods for polymerizing α-olefins) by use of metallocene compounds, since isotactic polymerization has been reported by W. Kaminsky et al., a lot of improvement studies have been conducted for improvement of stereoregularity and polymerization activity (Non-Patent Document 1).

In α-olefin polymerization by use of metallocene compounds, it is known that the stereoregularity and molecular weights of resultant olefin polymers greatly vary by the introduction of substituents to the cyclopentadienyl ring ligands of the metallocene compounds or by the crosslinking two cyclopentadienyl rings.

For example, when metallocene compounds having a ligand in which a cyclopentadienyl ring and a fluorenyl ring are crosslinked with each other are used as a polymerization catalyst for propylene, in terms of the stereoregularity of polymers, use of dimethylmethylene(cyclopentadienyl) (fluorenyl)zirconium dichloride gives syndiotactic polypropylene (Non-Patent Document 2); use of dimethylmethylene (3-methylcyclopentadienyl) (fluorenyl)zirconium dichloride, which has a methyl group attached to the 3 position of a cyclopentadienyl ring, gives hemi-isotactic polypropylene (Patent Document 1); and use of dimethylmethylene(3-tert-butylcyclopentadienyl) (fluorenyl)zirconium dichloride, which has a tert-butyl group attached to the 3 position of a cyclopentadienyl ring, gives isotactic polypropylene (Patent Document 2). A metallocene compound is also being considered in which some of the hydrogen atoms of a cyclopentadienyl group that is a ligand portion of the metallocene compound are substituted with alkyl groups (Patent Document 3).

In modifying these metallocene compounds, it is possible to obtain relatively high melting points, an indicator of the stereoregularity of a polymer, and to obtain sufficiently high molecular weight. Also, it is possible to produce a polymer with a high melting point and a sufficiently high molecular weight.

As an example of producing a poly-1-butene using such a metallocene catalyst as described above, a polymerization example with an ethylene bis(indenyl)zirconium dichloride is described in Non-Patent Document 3, but there is a problem such that a poly-1-butene obtained by polymerization using such a catalyst has a low molecular weight and the catalyst has a low polymerization activity as well.

As a catalyst capable of producing a poly-1-butene having a high molecular weight, Patent Document 4 describes a catalyst for olefin polymerization that is composed of a metallocene compound and an aluminoxane, but there is a problem such that a resultant poly-1-butene has a low molecular weight and the catalyst has an insufficient polymerization activity.

As an example of producing a poly-1-butene using another metallocene compound, an olefin polymerization catalyst composed of a metallocene compound and an aluminoxane described in Patent Document 5 and an olefin polymerization catalyst composed of a metallocene compound and an aluminoxane described in Non-Patent Document 3 are reported, but there is a problem such that both of them have an insufficient polymerization activity.

RELATED ART DOCUMENTS

Patent Documents

Patent Document 1: JP-A-H03-193796
Patent Document 2: JP-A-H06-122718
Patent Document 3: JP-A-H04-268307
Patent Document 4: JP-A-H08-225605
Patent Document 5: JP-A-2006-509059

Non-Patent Documents

Non-Patent Document 1: Angew. Chem. Int. Ed. Engl., 24, 507 (1985)
Non-Patent Document 2: J. Am. Chem. Soc., 110, 6255 (1988)
Non-Patent Document 3: Macromolecular Chemistry and Physics, 207 (2006) p. 2257-2279

SUMMARY OF THE INVENTION

Problems to be Solved by the Invention

Polymerization catalysts have not been developed enough which provide a polymer having a sufficiently high molecular weight by way of high polymerization activity in polymerization of 1-butene. Thus, a producing method has been strongly demanded which gives an olefin (co)polymer having a high molecular weight and containing structural units derived from 1-butene (also referred to as "1-butene-based (co)polymer" in the present invention) by way of high productivity.

Also, as such an olefin (co)polymer containing structural units derived from 1-butene, in an industrial production method, it would be desirable to produce 1-butene-based (co)polymers having the above properties, at a temperature of not lower than room temperature, preferably higher than room temperature, but no polymerization catalyst compatible with such production conditions was known.

The present invention is created to resolve the above issue, with a purpose of providing a method of producing a 1-butene-based (co)polymer having a high molecular weight, efficiently, economically and stably and at a high productivity under high temperature which is advantageous in industrial processes.

Means to Solve the Problems

The present inventors have intensively studied to solve the above problem and have discovered that the problem can be solved by a production method of an olefin (co)polymer containing structural units derived from 1-butene, the method (co)polymerizing a monomer containing 1-butene, under a specific polymerization temperature and a polymerization pressure in the presence of an olefin polymerization catalyst containing a novel metallocene compound having a specific structure, to complete the present invention.

The production method of an olefin copolymer containing structural units derived from 1-butene in the present invention comprises a step of copolymerizing at least a 1-butene and propylene, optionally an α-olefin having 2 or more carbon atoms (excluding 1-butene and propylene) and optionally (an)other monomer(s) under the conditions of a polymerization temperature of not less than 55° C. and not more than 200° C. and a polymerization pressure of not less than 0.1 MPaG and not more than 5.0 MPaG in the presence of an olefin polymerization catalyst containing (A) a crosslinked metallocene compound represented by General Formula [I] below, and (B) at least one compound selected from (b-1) an organoaluminum oxy-compound, (b-2) a compound that forms an ion pair by reacting with the crosslinked metallocene compound (A), and (b-3) an organoaluminum compound;

wherein the obtained olefin copolymer (1) containing structural units derived from 1-butene includes at least structural units derived from 1-butene, includes the total content of structural units derived from ethylene and an α-olefin having 4 or more carbon atoms (including 1-butene) in the range of not less than 8 mol % and not more than 50 mol %, and includes the content of structural units derived from propylene in the range of not less than 50 mol % and not more than 92 mol % (provided that the total of the content of structural units derived from ethylene and the α-olefin having 4 or more carbon atoms (including 1-butene) and the content of structural units derived from propylene is 100 mol %), and wherein a peak melting point (Tm) obtained from differential scanning calorimetry (DSC) is not less than 50° C. and less than 110° C., or the peak melting point is not observed from DSC.

[Chem. 1]

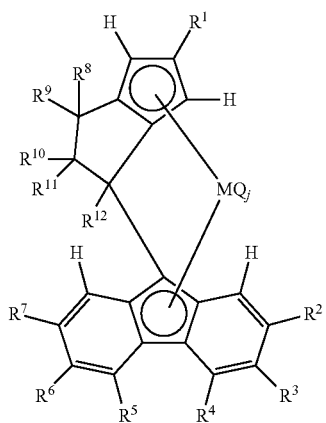

[I]

(In the formula, $R^1$ is an adamantyl group derivative; $R^2$ and $R^7$ are selected from a hydrocarbon group, a silicon-containing group, and a halogen-containing hydrocarbon group; $R^3$ and $R^6$ are hydrogen atoms; $R^4$, $R^5$, $R^8$, $R^9$, $R^{10}$, $R^{11}$, and $R^{12}$ are selected from a hydrogen atom, a hydrocarbon group, a silicon-containing group, a halogen atom, and a halogen-containing hydrocarbon group and may be the same or different from each other, and adjacent substituents among $R^4$, $R^5$, $R^8$, $R^9$, $R^{10}$, $R^{11}$, and $R^{12}$ may combine to form a ring; M is a Group 4 transition metal; Q is a halogen atom, a hydrocarbon group, an anionic ligand, or a neutral ligand that is bondable with a lone pair and may be the same or different from each other; and j is an integer between 1 and 4.)

The production method of an olefin (co)polymer containing structural units derived from 1-butene according to the present invention comprises a step of (co)polymerizing at least a 1-butene, optionally an α-olefin having 2 or more carbon atoms (excluding 1-butene) and optionally (an)other monomer(s) under the conditions of a polymerization temperature of not less than 55° C. and not more than 200° C. and a polymerization pressure of not less than 0.1 MPaG and not more than 5.0 MPaG in the presence of an olefin polymerization catalyst containing (A) a crosslinked metallocene compound represented by General Formula [I] above, and (B) at least one compound selected from (b-1) an organoaluminum oxy-compound, (b-2) a compound that forms an ion pair by reacting with the crosslinked metallocene compound (A), and (b-3) an organoaluminum compound;

wherein the obtained olefin (co)polymer (2) containing structural units derived from 1-butene includes at least structural units derived from 1-butene, includes the content of structural units derived from 1-butene in the range of more than 50 mol % and 100 mol % or less, and includes the total content of structural units derived from an α-olefin having 2 or more carbon atoms (excluding 1-butene) in the range of 0 mol % or more and less than 50 mol % (provided that the total of the content of structural units derived from 1-butene and the content of structural units derived from the α-olefin having 2 or more carbon atoms (excluding 1-butene) is 100 mol %).

In General Formula [I] above, $R^1$ is preferably a 1-adamantyl group.

In General Formula [I] above, $R^2$ and $R^7$ are preferably hydrocarbon groups having 4 to 10 carbon atoms.

In General Formula [I] above, $R^4$ and $R^5$ are preferably hydrogen atoms.

In General Formula [I] above, $R^{12}$ is preferably a hydrocarbon group having 1 to 20 carbon atoms.

In General Formula [I] above, $R^8$ to $R^{11}$ are preferably hydrogen atoms or hydrocarbon groups having 1 to 20 carbon atoms.

In General Formula [I] above, $R^{10}$ and $R^{11}$ are preferably hydrogen atoms.

In General Formula [I] above, $R^8$ and $R^9$ are preferably hydrocarbon groups having 1 to 20 carbon atoms.

According to the production method of the present invention, (co)polymerization is preferably performed in the presence of hydrogen.

In the production method of an olefin (co)polymer containing structural units derived from 1-butene according to the present invention, the olefin copolymer (1) is preferably obtained by copolymerization of at least a 1-butene and propylene and optionally (an)other monomer(s) and preferably satisfies both of the requirements (i) and (ii) below.

(i) The structural units derived from propylene (P) are 51 mol %≤P≤90 mol %, and the structural units derived from 1-butene (B) are 10 mol %≤B≤49 mol % (provided that (P)+(B)=100 mol %).

(ii) The intrinsic viscosity [η] in decalin at 135° C. is 1.3 (dl/g)≤[η]≤10 (dl/g).

In the production method of an olefin (co)polymer containing structural units derived from 1-butene according to the present invention, the olefin copolymer (1) is preferably obtained by copolymerization of at least a 1-butene, propylene and ethylene and optionally (an)other monomer(s), and preferably satisfies both of the requirements (i) and (ii) below.

(i) The structural units derived from propylene (P) are 51 mol %≤P≤92 mol %, the structural units derived from 1-butene (B) are 4 mol %≤B≤45 mol %, and the structural units derived from ethylene (E) are 4 mol %≤E≤45 mol % (provided that (P)+(B)+(E)=100 mol %).

(ii) The intrinsic viscosity [η] in decalin at 135° C. is 1.3 (dl/g)≤[η]≤10 (dl/g).

In the production method of an olefin (co)polymer containing structural units derived from 1-butene according to the present invention, the peak melting point (Tm) obtained from the differential scanning calorimetry (DSC) of the olefin (co)polymer (2) is preferably not less than 50° C. and less than 130° C., or the peak melting point is preferably not observed from DSC.

In the production method of an olefin (co)polymer containing structural units derived from 1-butene according to the present invention, the olefin (co)polymer (2) is preferably obtained by copolymerization of at least a 1-butene and propylene and optionally (an)other monomer(s) and preferably satisfies both of the requirements (i) and (ii) below.

(i) The structural units derived from 1-butene (B) are 51 mol %≤B≤95 mol %, and the structural units derived from propylene (P) are 5 mol %≤P≤49 mol % (provided that (B)+(P)=100 mol %).

(ii) The intrinsic viscosity [η] in decalin at 135° C. is 1.3 (dl/g)≤[η]≤10 (dl/g).

In the production method of an olefin (co)polymer containing structural units derived from 1-butene according to the present invention, the olefin (co)polymer (2) is preferably obtained by copolymerization of at least a 1-butene and ethylene and optionally (an)other monomer(s) and preferably satisfies both of the requirements (i) and (ii) below.

(i) The structural units derived from 1-butene (B) are 51 mol %≤B≤95 mol %, and the structural units derived from ethylene (E) are 5 mol %≤E≤49 mol % (provided that (B)+(E)=100 mol %).

(ii) The intrinsic viscosity [η] in decalin at 135° C. is 1.3 (dl/g)≤[η]≤10 (dl/g).

In the production method of the olefin (co)polymer (1) or (2) containing structural units derived from 1-butene according to the present invention, a 1-butene and an α-olefin having 2 or more carbon atoms (excluding 1-butene) are preferably supplied to a polymerization reaction system continuously or intermittently while satisfying the requirement (i) below.

(i) The supply ratio of 1-butene (B) to α-olefin having 2 or more carbon atoms (excluding 1-butene) (O) (molar ratio, B/O) is 1/1000≤(B/O)≤1000/1. Here, the α-olefin having 2 or more carbon atoms (excluding 1-butene) is in the total amount (total molar amount) of the α-olefins having 2 or more carbon atoms supplied for polymerization reaction other than 1-butene.

In addition, according to the production method, hydrogen is preferably supplied to a copolymerization reaction system continuously or intermittently while satisfying the requirements (ii) and (iii) below, and copolymerization ispreferablyperformed in the presence of hydrogen.

(ii) The supply amount of hydrogen (H) is 0.001 normal liter/hr≤H≤1000 normal liter/hr.

(iii) The olefin polymerization activity is not less than 100 kg-polymer/mmol-M/hr and not more than 50000 kg-polymer/mmol-M/hr (wherein M represents a Group 4 transition metal in General Formula [I]).

Advantageous Effects of Invention

According to the present invention, an olefin (co)polymer that has a high molecular weight and contains structural units derived from 1-butene can be produced efficiently, economically and stably and at a high productivity under high temperature which is advantageous in industrial processes, by (co)polymerization of a monomer containing 1-butene under a specific polymerization temperature and polymerization pressure in the presence of an olefin polymerization catalyst containing a useful and novel metallocene compound having a specific structure.

Furthermore, according to the present invention, an olefin (co)polymer that has a high molecular weight and contains structural units derived from 1-butene can be produced at a very high productivity especially in the presence of hydrogen because the addition of hydrogen enhances the activity dramatically.

BRIEF DESCRIPTION OF THE DRAWING

FIG. 1 shows the relationship of the intrinsic viscosity (dl/g) and polymerization activity (kg-polymer/mmol-Zr/hr) of the 1-polymers obtained in Examples 1G, 2G and Comparative Examples 1G to 3G.

DESCRIPTION OF EMBODIMENTS

The production method of an olefin (co)polymer containing structural units derived from 1-butene according to the present invention is described from hereunder. Descriptions are given for a crosslinked metallocene compound represented by General Formula [I] of the present invention (hereinafter referred to as metallocene compounds (A)); examples of the preferred metallocene compounds (A); the production method of metallocene compounds (A); preferred forms of use of metallocene compounds (A) for the olefin polymerization catalyst; and the production method of an olefin (co)polymer containing structural units derived from 1-butene under a specific polymerization temperature and polymerization pressure in the presence of an olefin polymerization catalyst containing the metallocene compounds (A). Also, the technical scope of the present invention is not limited to the following embodiments.

[Metallocene Compounds (A)]

Metallocene compounds (A) of the present invention are represented by Formula [1] below.

[Chem. 2]

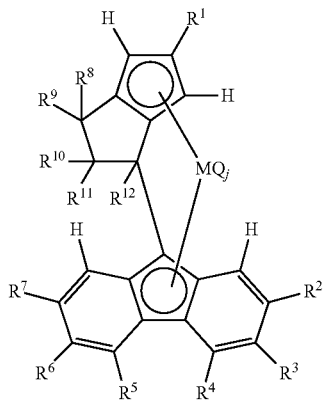

[I]

In the formula, $R^1$ is an adamantyl group derivative; $R^2$ and $R^7$ are selected from a hydrocarbon group, a silicon-containing group, and a halogen-containing hydrocarbon group; $R^3$ and $R^6$ are hydrogen atoms; $R^4$, $R^5$, $R^8$, $R^9$, $R^{10}$, $R^{11}$, and $R^{12}$ are selected from a hydrogen atom, a hydrocarbon group, a silicon-containing group, a halogen atom, and a halogen-containing hydrocarbon group and may be the same or different from each other, and adjacent substituents among $R^4$, $R^5$, $R^8$, $R^9$, $R^{10}$, $R^{11}$, and $R^{12}$ may combine to form a ring; M is a Group 4 transition metal; Q is a halogen atom, a hydrocarbon group, an anionic ligand, or a neutral ligand that is bondable with a lone pair and may be the same or different from each other; and j is an integer between 1 and 4.

By using an olefin polymerization catalyst containing a metallocene compound (A) of the present invention, for example when a 1-butene-based (co)polymer such as that of propylene and 1-butene is to be obtained by (co) polymerization, a 1-butene-based (co)polymer at a high molecular weight can be produced efficiently, economically and stably and at a high productivity under high temperature which is advantageous in industrial processes. That is, the metallocene compound (A) of the present invention may be preferably used as a catalyst component for olefin polymerization to produce olefin polymers, in particular, 1-butene-based (co)polymers.

The carbon numbers of the hydrocarbon groups of $R^2$, $R^4$, $R^5$, and $R^7$ to $R^{12}$ are preferably between 1 and 40, and more preferably between 1 and 20. Examples of hydrocarbon groups include alkyl groups having 1 to 20 carbon atoms, saturated alicyclic groups having 3 to 20 carbon atoms, aryl groups having 6 to 20 carbon atoms, and aralkyl groups having 7 to 20 carbon atoms.

Examples of alkyl groups having 1 to 20 carbon atoms include linear alkyl groups such as methyl group, ethyl group, n-propyl group, n-butyl group, n-pentyl group, n-hexyl group, n-heptyl group, n-octyl group, n-nonyl group, and n-decanyl group; and branched alkyl groups such as iso-propyl group, tert-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, and 1-methyl-1-isopropyl-2-methylpropyl group.

Examples of saturated alicyclic groups having 3 to 20 carbon atoms include cycloalkyl groups such as cyclopentyl group, cyclohexyl group, cycloheptyl group, and cyclooctyl group; and alicyclic polycyclic groups such as norbornyl group and adamantyl group.

Examples of aryl groups having 6 to 20 carbon atoms include unsubstituted aryl groups such as phenyl group, naphthyl group, phenanthryl group, anthracenyl group, and biphenyl group; and alkylaryl groups such as o-tolyl group, m-tolyl group, p-tolyl group, ethylphenyl group, n-propylphenyl group, iso-propylphenyl group, n-butylphenyl group, sec-butylphenyl group, tert-butylphenyl, and xylyl group.

Examples of aralkyl groups having 7 to 20 carbon atoms include unsubstituted aralkyl groups such as benzyl group, cumyl group, α-phenethyl group, β-phenethyl group, diphenylmethyl group, naphthylmethyl group, and neophyl group; and alkylaralkyl groups such as o-methylbenzyl group, m-methylbenzyl group, p-methylbenzyl group, ethylbenzyl group, n-propylbenzyl group, isopropylbenzyl group, n-butylbenzyl group, sec-butylbenzyl group, and tert-butylbenzyl group.

Hydrocarbon groups particularly preferably have 1 to 10 carbon atoms.

Examples of silicon-containing groups include alkylsilyl groups such as methylsilyl group, dimethylsilyl group, trimethylsilyl group, ethylsilyl group, diethylsilyl group, triethylsilyl group, and dimethyl-tert-butylsilyl group; and arylsilyl groups such as dimethylphenylsilyl group, diphenylmethylsilyl group, and triphenylsilyl group.

Examples of halogen-containing hydrocarbon groups include the groups that result from substitution of at least one hydrogen atom of the above-mentioned hydrocarbon group with a halogen atom, specifically halogen-substituted alkyl groups including fluoroalkyl groups such as trifluoromethyl group; halogen-substituted aryl groups including halogen-substituted groups of the above-mentioned unsubstituted aryl groups including fluoroaryl groups such as pentafluorophenyl group, chloroaryl groups such as o-chlorophenyl group, m-chlorophenyl group, p-chlorophenyl group, and chloronaphthyl group, bromoaryl groups such as o-bromophenyl group, m-bromophenyl group, p-bromophenyl group, and bromonaphthyl group, and iodoaryl groups such as o-iodophenyl group, m-iodophenyl group, p-iodophenyl group, and iodonaphthyl group, and halogen-substituted groups of the above-mentioned alkylaryl groups including fluoroalkylaryl groups such as trifluoromethylphenyl group, bromoalkylaryl groups such as bromomethylphenyl group and dibromomethylphenyl group, and iodoalkylaryl groups such as iodomethylphenyl group and diiodomethylphenyl group; and halogen-substituted aralkyl groups including halogen-substituted groups of the above-mentioned unsubstituted aralkyl groups including chloroaralkyl groups such as o-chlorobenzyl group, m-chlorobenzyl group, p-chlorobenzyl group, and chlorophenethyl group, bromoaralkyl groups such as o-bromobenzyl group, m-bromobenzyl group, p-bromobenzyl group, and bromophenethyl group, and iodoaralkyl groups such as o-iodobenzyl group, m-iodobenzyl group, p-iodobenzyl group, and iodophenethyl group.

In Formula [I], $R^1$ is preferably 1-adamantyl group, 2-adamantyl group, 3,5-dimethyl-1-adamantyl group, or 3,5,7-trimethyl-1-adamantyl group, more preferably 1-adamantyl group, 3,5-dimethyl-1-adamantyl group, or 3,5,7-trimethyl-1-adamantyl group, and particularly preferably 1-adamantyl group, in terms of efficiently producing a 1-butene-based (co)polymer that is formed because $R^1$ is an above-mentioned group.

In Formula [I], the positions 1 and 8 of the fluorenyl are preferably hydrogen atoms in terms of efficiently producing a 1-butene-based (co)polymer. The positions 3 and 6 of the fluorenyl are preferably hydrogen atoms in terms of the melt flowability of a 1-butene-based (co)polymer produced.

$R^2$ and $R^7$ are preferably each independently a hydrocarbon group having 4 to 10 carbon atoms. Hydrocarbon groups having 4 to 10 carbon atoms are preferably isobutyl group, tert-butyl group, tert-amyl group, phenyl group, 1-methylcyclohexyl group, or 1-adamantyl groups, more preferably tert-butyl group, tert-pentyl group, 1-methylcyclohexyl group, or 1-adamantyl group, and particularly preferably tert-butyl group. $R^2$ and $R^7$ are preferably the above-mentioned groups in terms of efficiently producing a 1-butene-based (co)polymer.

Examples of silicon-containing groups include alkylsilyl groups such as methylsilyl group, dimethylsilyl group, trimethylsilyl group, ethylsilyl group, diethylsilyl group, triethylsilyl group, and dimethyl-tert-butylsilyl group; and arylsilyl groups such as dimethylphenylsilyl group, diphenylmethylsilyl group, and triphenylsilyl group.

Examples of halogen atoms include fluorine atom, chlorine atom, bromine atom, and iodine atom. Examples of halogen-containing hydrocarbon groups include groups that result from substitution of at least one hydrogen atom of the above-mentioned hydrocarbon group with a halogen atom, specifically halogen-substituted alkyl groups including fluoroalkyl groups such as trifluoromethyl group; halogen-substituted aryl groups including halogen-substituted groups of the above-mentioned unsubstituted aryl groups including fluoroaryl groups such as pentafluorophenyl group, chloroaryl groups such as o-chlorophenyl group, m-chlorophenyl group, p-chlorophenyl group, and chloronaphthyl group, bromoaryl groups such as o-bromophenyl group, m-bromophenyl group, p-bromophenyl group, and bromonaphthyl group, and iodoaryl groups such as o-iodophenyl group, m-iodophenyl group, p-iodophenyl group, and iodonaphthyl group, and halogen-substituted groups of the above-mentioned alkylaryl groups including fluoroalkylaryl groups such as trifluoromethylphenyl group, bromoalkylaryl groups such as bromomethylphenyl group and dibromomethylphenyl group, and iodoalkylaryl groups such as iodomethylphenyl group and diiodomethylphenyl group; halogen-substituted aralkyl groups including halogen-substituted groups of the above-mentioned unsubstituted aralkyl groups including chloroaralkyl groups such as o-chlorobenzyl group, m-chlorobenzyl group, p-chlorobenzyl group, and chlorophenethyl group, bromoaralkyl groups such as o-bromobenzyl group, m-bromobenzyl group, p-bromobenzyl group, and bromophenethyl group, and iodoaralkyl groups such as o-iodobenzyl group, m-iodobenzyl group, p-iodobenzyl group, and iodophenethyl group.

In Formula [I], $R^3$ and $R^6$ are hydrogen atoms. This is preferable in terms of efficiently producing a 1-butene-based (co)polymer that forms because $R^3$ and $R^6$ are hydrogen atoms.

In Formula [I], $R^4$ and $R^5$ are preferably each independently hydrogen atom, hydrocarbon group having 1 to 10 carbon atoms, or halogen atom, and among those, more preferably hydrogen atom, methyl group, ethyl group, chloro group, bromo group, or fluoro group, and particularly preferably hydrogen atom. This is preferable in terms of efficiently producing a 1-butene-based (co) polymer that forms because $R^4$ and $R^5$ are one of the above groups.

In Formula [I], $R^8$, $R^9$, $R^{10}$ and $R^{11}$ are preferably each independently hydrogen atoms or hydrocarbon groups having 1 to 20 carbon atoms. Among those, more preferably, hydrogen atom, methyl group, ethyl group, isopropyl group, cyclohexyl group, $R^9$ and $R^{10}$ are groups that combine together to form a cyclopentane ring, or $R^9$ and $R^{10}$ are groups that combine together to form a cyclohexane ring, and particularly preferably hydrogen atom, methyl group, isopropyl group, or $R^9$ and $R^{10}$ are groups that combine together and form a cyclohexane ring. $R^8$ and $R^9$ are particularly preferably a hydrocarbon group having 1 to 20 carbon atoms. $R^{10}$ and $R^{11}$ are particularly preferably hydrogen atoms.

In Formula [I], $R^{12}$ is more preferably a hydrocarbon group having 1 to 10 carbon atoms. It is particularly preferably methyl group, ethyl, n-propyl, n-butyl group, or phenyl group, and particularly preferably methyl group. This is preferable in terms of efficiently producing a 1-butene-based (co)polymer that forms because $R^{12}$ is an above-mentioned group.

<M, Q, and j>

M is a Group 4 transition metal, that is, Ti, Zr, or Hf. It is preferably Zr or Hf and particularly preferably Zr.

Q represents a halogen atom (e.g. fluorine atom, chlorine atom, bromine atom, and iodine atom), a hydrocarbon group, a neutral conjugated or nonconjugated diene having 10 or fewer carbon atoms, an anionic ligand, or a neutral ligand that is bondable with a lone pair.

The hydrocarbon group for Q is preferably alkyl group having 1 to 10 carbon atoms or cycloalkyl group having 3 to 10 carbon atoms. Examples of alkyl group having 1 to 10 carbon atoms include methyl group, ethyl group, n-propyl group, iso-propyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, tert-butyl group, 1,1-dimethylbutyl group, 1,1,3-trimethylbutyl group, and neopentyl group; and examples of cycloalkyl group having 3 to 10 carbon atoms include cyclohexylmethyl group, cyclohexyl group, and 1-methyl-1-cyclohexyl group. It is more preferable for the hydrocarbon group to have 5 or fewer carbon atoms.

Examples of the neutral conjugated or nonconjugated diene having 10 or fewer carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Examples of the anionic ligand include alkoxy groups such as methoxy and tert-butoxy; aryloxy groups such as phenoxy; carboxylate groups such as acetate and benzoate; and sulfonate groups such as mesylate and tosylate.

Examples of the neutral ligand that is bondable with a lone pair include organophosphorus compounds such as trimethylphosphine, triethylphosphine, triphenylphosphine, and diphenylmethylphosphine; and ethers such as tetrahydrofuran (THF), diethyl ether, dioxane, and 1,2-dimethoxyethane.

A preferred embodiment of Q is a halogen atom or alkyl group having 1 to 5 carbon atoms.

j is an integer between 1 and 4, preferably 2.

(Example of Metallocene Compounds (A))

Specific examples of metallocene compounds (A) of the present invention will be shown, but the scope of the invention is not limited to these examples. Further, metallocene compounds (A) in the present invention may be used singly, or two or more can be used in combination.

For convenience purposes in explanation, if the ligand structure except for MQ$_j$ (metal moiety) of the metallocene compound is divided into two, cyclopentadienyl derivative moiety and fluorenyl moiety, and represents fluorenyl moiety with Flu, the cyclopentadienyl derivative moiety is represented by the structure (i) below.

[Chem. 3]

Structure (i)

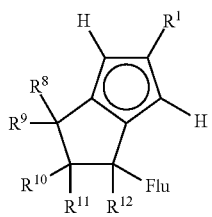

Examples of a structure that forms by two substituents combining together include the following structure (i-1) (wherein $R^9$ and $R^{10}$ combine together and form a cyclopentane ring) and the following structure (i-2) (wherein $R^9$ and $R^{10}$ combine together and form a cyclohexane ring).

[Chem. 4]

(i-1)

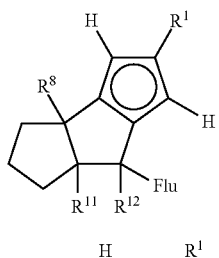

(i-2)

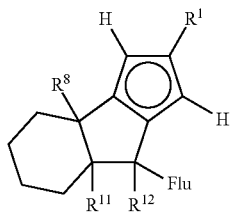

If the ligand structure except for MQ$_j$ (metal moiety) in the metallocene compound is divided into three, adamantyl derivative moiety (α), cyclopentadienyl derivative moiety (β), and fluorenyl moiety (γ), and if the adamantyl derivative moiety and the cyclopentadienyl derivative moiety are represented by Adm and Cp, respectively, specific examples of each partial structure are shown in Tables 1 through 3, and specific examples of ligand structures according to these combinations are shown in Tables 4-1 through 4-4.

TABLE 1

| Adamantyl Derivative Moiety | |
|---|---|
| α1 | 1-adamantyl |
| α2 | 2-adamantyl |
| α3 | 3,5-dimethyl-1-adamantyl |
| α4 | 3,5,7-trimethyl-1-adamantyl |

TABLE 2

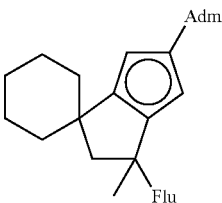 β1

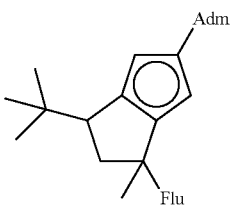 β2

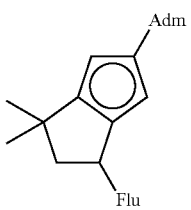 β3

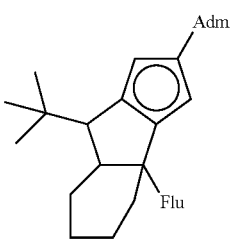 β4

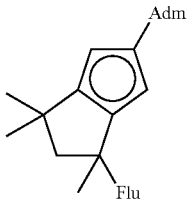 β5

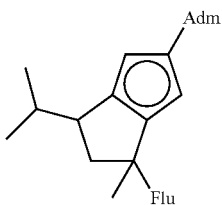 β6

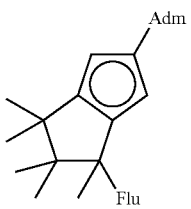 β7

TABLE 2-continued
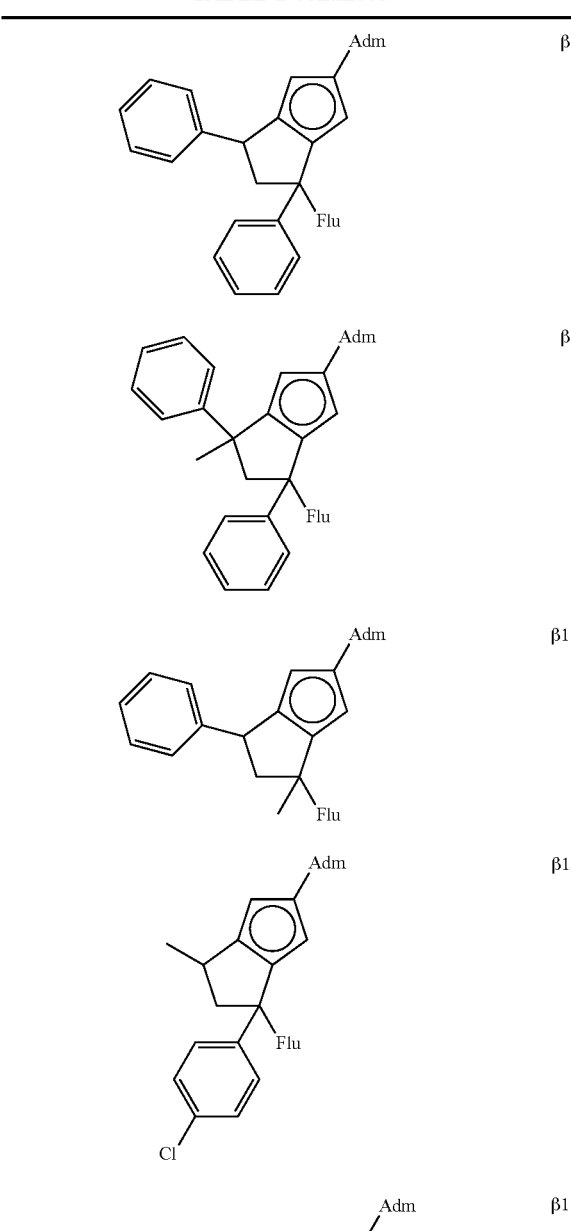
TABLE 2-continued
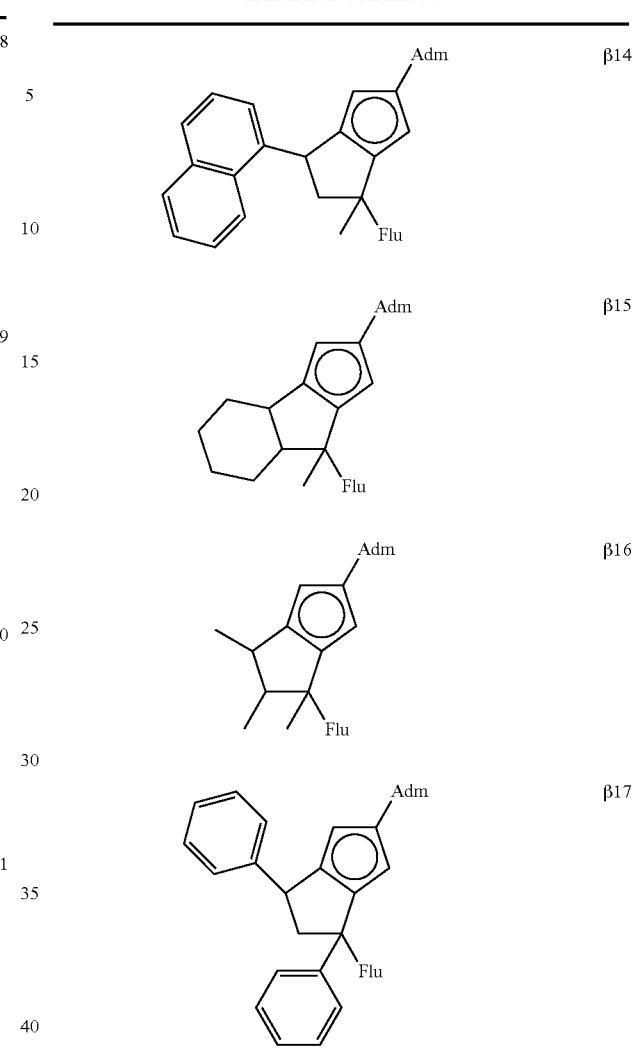
TABLE 3
Fluorenyl Derivative Moiety
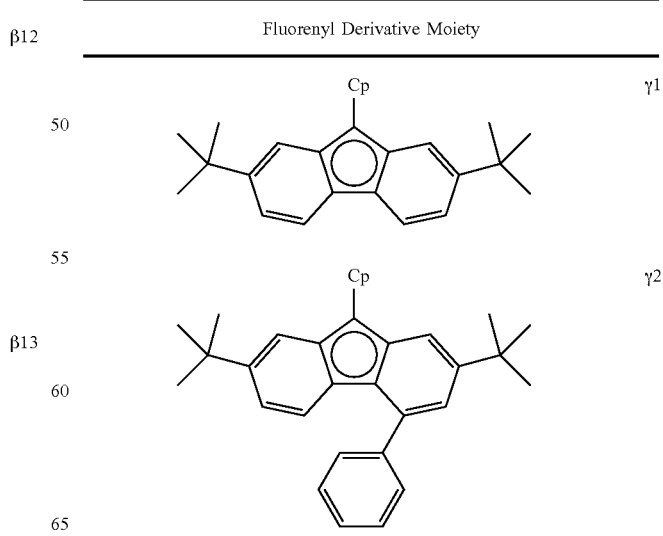

TABLE 3-continued

Fluorenyl Derivative Moiety

γ3, γ4, γ5, γ6, γ7, γ8, γ9, γ10, γ11, γ12, γ13

TABLE 4-1

| | Ligand Structure 1 | | |
|---|---|---|---|
| No. | Adamantyl Derivative Moiety | Cyclopentadienyl Derivative Moiety | Fluorenyl Derivative Moiety |
| 1 | α1 | β1 | γ1 |
| 2 | α1 | β1 | γ2 |
| 3 | α1 | β1 | γ3 |
| 4 | α1 | β1 | γ4 |
| 5 | α1 | β1 | γ5 |
| 6 | α1 | β1 | γ6 |
| 7 | α1 | β1 | γ7 |
| 8 | α1 | β1 | γ8 |
| 9 | α1 | β1 | γ9 |
| 10 | α1 | β1 | γ10 |
| 11 | α1 | β1 | γ11 |
| 12 | α1 | β1 | γ12 |
| 13 | α1 | β1 | γ13 |
| 14 | α1 | β2 | γ1 |
| 15 | α1 | β2 | γ2 |
| 16 | α1 | β2 | γ3 |
| 17 | α1 | β2 | γ4 |
| 18 | α1 | β2 | γ5 |
| 19 | α1 | β2 | γ6 |
| 20 | α1 | β2 | γ7 |
| 21 | α1 | β2 | γ8 |
| 22 | α1 | β2 | γ9 |
| 23 | α1 | β2 | γ10 |
| 24 | α1 | β2 | γ11 |
| 25 | α1 | β2 | γ12 |
| 26 | α1 | β2 | γ13 |
| 27 | α1 | β3 | γ1 |
| 28 | α1 | β3 | γ2 |
| 29 | α1 | β3 | γ3 |
| 30 | α1 | β3 | γ4 |
| 31 | α1 | β3 | γ5 |
| 32 | α1 | β3 | γ6 |
| 33 | α1 | β3 | γ7 |
| 34 | α1 | β3 | γ8 |
| 35 | α1 | β3 | γ9 |
| 36 | α1 | β3 | γ10 |
| 37 | α1 | β3 | γ11 |
| 38 | α1 | β3 | γ12 |
| 39 | α1 | β3 | γ13 |
| 40 | α1 | β4 | γ1 |
| 41 | α1 | β4 | γ2 |
| 42 | α1 | β4 | γ3 |
| 43 | α1 | β4 | γ4 |
| 44 | α1 | β4 | γ5 |
| 45 | α1 | β4 | γ6 |
| 46 | α1 | β4 | γ7 |
| 47 | α1 | β4 | γ8 |
| 48 | α1 | β4 | γ9 |

TABLE 4-1-continued

Ligand Structure 1

| No. | Adamantyl Derivative Moiety | Cyclo-pentadienyl Derivative Moiety | Fluorenyl Derivative Moiety |
|---|---|---|---|
| 49 | α1 | β4 | γ10 |
| 50 | α1 | β4 | γ11 |
| 51 | α1 | β4 | γ12 |
| 52 | α1 | β4 | γ13 |
| 53 | α1 | β5 | γ1 |
| 54 | α1 | β5 | γ2 |
| 55 | α1 | β5 | γ3 |
| 56 | α1 | β5 | γ4 |
| 57 | α1 | β5 | γ5 |
| 58 | α1 | β5 | γ6 |
| 59 | α1 | β5 | γ7 |
| 60 | α1 | β5 | γ8 |
| 61 | α1 | β5 | γ9 |
| 62 | α1 | β5 | γ10 |
| 63 | α1 | β5 | γ11 |
| 64 | α1 | β5 | γ12 |
| 65 | α1 | β5 | γ13 |
| 66 | α1 | β6 | γ1 |
| 67 | α1 | β6 | γ2 |
| 68 | α1 | β6 | γ3 |
| 69 | α1 | β6 | γ4 |
| 70 | α1 | β6 | γ5 |
| 71 | α1 | β6 | γ6 |
| 72 | α1 | β6 | γ7 |
| 73 | α1 | β6 | γ8 |
| 74 | α1 | β6 | γ9 |
| 75 | α1 | β6 | γ10 |
| 76 | α1 | β6 | γ11 |
| 77 | α1 | β6 | γ12 |
| 78 | α1 | β6 | γ13 |
| 79 | α1 | β7 | γ1 |
| 80 | α1 | β7 | γ2 |
| 81 | α1 | β7 | γ3 |
| 82 | α1 | β7 | γ4 |
| 83 | α1 | β7 | γ5 |
| 84 | α1 | β7 | γ6 |
| 85 | α1 | β7 | γ7 |
| 86 | α1 | β7 | γ8 |
| 87 | α1 | β7 | γ9 |
| 88 | α1 | β7 | γ10 |
| 89 | α1 | β7 | γ11 |
| 90 | α1 | β7 | γ12 |
| 91 | α1 | β7 | γ13 |
| 92 | α1 | β8 | γ1 |
| 93 | α1 | β8 | γ2 |
| 94 | α1 | β8 | γ3 |
| 95 | α1 | β8 | γ4 |
| 96 | α1 | β8 | γ5 |
| 97 | α1 | β8 | γ6 |
| 98 | α1 | β8 | γ7 |
| 99 | α1 | β8 | γ8 |
| 100 | α1 | β8 | γ9 |
| 101 | α1 | β8 | γ10 |
| 102 | α1 | β8 | γ11 |
| 103 | α1 | β8 | γ12 |
| 104 | α1 | β8 | γ13 |
| 105 | α1 | β9 | γ1 |
| 106 | α1 | β9 | γ2 |
| 107 | α1 | β9 | γ3 |
| 108 | α1 | β9 | γ4 |
| 109 | α1 | β9 | γ5 |
| 110 | α1 | β9 | γ6 |
| 111 | α1 | β9 | γ7 |
| 112 | α1 | β9 | γ8 |
| 113 | α1 | β9 | γ9 |
| 114 | α1 | β9 | γ10 |
| 115 | α1 | β9 | γ11 |
| 116 | α1 | β9 | γ12 |
| 117 | α1 | β9 | γ13 |
| 118 | α1 | β10 | γ1 |
| 119 | α1 | β10 | γ2 |
| 120 | α1 | β10 | γ3 |
| 121 | α1 | β10 | γ4 |
| 122 | α1 | β10 | γ5 |
| 123 | α1 | β10 | γ6 |
| 124 | α1 | β10 | γ7 |
| 125 | α1 | β10 | γ8 |
| 126 | α1 | β10 | γ9 |
| 127 | α1 | β10 | γ10 |
| 128 | α1 | β10 | γ11 |
| 129 | α1 | β10 | γ12 |
| 130 | α1 | β10 | γ13 |
| 131 | α1 | β11 | γ1 |
| 132 | α1 | β11 | γ2 |
| 133 | α1 | β11 | γ3 |
| 134 | α1 | β11 | γ4 |
| 135 | α1 | β11 | γ5 |
| 136 | α1 | β11 | γ6 |
| 137 | α1 | β11 | γ7 |
| 138 | α1 | β11 | γ8 |
| 139 | α1 | β11 | γ9 |
| 140 | α1 | β11 | γ10 |
| 141 | α1 | β11 | γ11 |
| 142 | α1 | β11 | γ12 |
| 143 | α1 | β11 | γ13 |
| 144 | α1 | β12 | γ1 |
| 145 | α1 | β12 | γ2 |
| 146 | α1 | β12 | γ3 |
| 147 | α1 | β12 | γ4 |
| 148 | α1 | β12 | γ5 |
| 149 | α1 | β12 | γ6 |
| 150 | α1 | β12 | γ7 |
| 151 | α1 | β12 | γ8 |
| 152 | α1 | β12 | γ9 |
| 153 | α1 | β12 | γ10 |
| 154 | α1 | β12 | γ11 |
| 155 | α1 | β12 | γ12 |
| 156 | α1 | β12 | γ13 |
| 157 | α1 | β13 | γ1 |
| 158 | α1 | β13 | γ2 |
| 159 | α1 | β13 | γ3 |
| 160 | α1 | β13 | γ4 |
| 161 | α1 | β13 | γ5 |
| 162 | α1 | β13 | γ6 |
| 163 | α1 | β13 | γ7 |
| 164 | α1 | β13 | γ8 |
| 165 | α1 | β13 | γ9 |
| 166 | α1 | β13 | γ10 |
| 167 | α1 | β13 | γ11 |
| 168 | α1 | β13 | γ12 |
| 169 | α1 | β13 | γ13 |
| 170 | α1 | β14 | γ1 |
| 171 | α1 | β14 | γ2 |
| 172 | α1 | β14 | γ3 |
| 173 | α1 | β14 | γ4 |
| 174 | α1 | β14 | γ5 |
| 175 | α1 | β14 | γ6 |
| 176 | α1 | β14 | γ7 |
| 177 | α1 | β14 | γ8 |
| 178 | α1 | β14 | γ9 |
| 179 | α1 | β14 | γ10 |
| 180 | α1 | β14 | γ11 |
| 181 | α1 | β14 | γ12 |
| 182 | α1 | β14 | γ13 |
| 183 | α1 | β15 | γ1 |
| 184 | α1 | β15 | γ2 |
| 185 | α1 | β15 | γ3 |
| 186 | α1 | β15 | γ4 |
| 187 | α1 | β15 | γ5 |
| 188 | α1 | β15 | γ6 |
| 189 | α1 | β15 | γ7 |
| 190 | α1 | β15 | γ8 |
| 191 | α1 | β15 | γ9 |
| 192 | α1 | β15 | γ10 |
| 193 | α1 | β15 | γ11 |
| 194 | α1 | β15 | γ12 |

TABLE 4-1-continued

Ligand Structure 1

| No. | Adamantyl Derivative Moiety | Cyclopentadienyl Derivative Moiety | Fluorenyl Derivative Moiety |
|---|---|---|---|
| 195 | α1 | β15 | γ13 |
| 196 | α1 | β16 | γ1 |
| 197 | α1 | β16 | γ2 |
| 198 | α1 | β16 | γ3 |
| 199 | α1 | β16 | γ4 |
| 200 | α1 | β16 | γ5 |
| 201 | α1 | β16 | γ6 |
| 202 | α1 | β16 | γ7 |
| 203 | α1 | β16 | γ8 |
| 204 | α1 | β16 | γ9 |
| 205 | α1 | β16 | γ10 |
| 206 | α1 | β16 | γ11 |
| 207 | α1 | β16 | γ12 |
| 208 | α1 | β16 | γ13 |
| 209 | α1 | β17 | γ1 |
| 210 | α1 | β17 | γ2 |
| 211 | α1 | β17 | γ3 |
| 212 | α1 | β17 | γ4 |
| 213 | α1 | β17 | γ5 |
| 214 | α1 | β17 | γ6 |
| 215 | α1 | β17 | γ7 |
| 216 | α1 | β17 | γ8 |
| 217 | α1 | β17 | γ9 |
| 218 | α1 | β17 | γ10 |
| 219 | α1 | β17 | γ11 |
| 220 | α1 | β17 | γ12 |
| 221 | α1 | β17 | γ13 |
| 222 | α2 | β1 | γ1 |
| 223 | α2 | β1 | γ2 |
| 224 | α2 | β1 | γ3 |
| 225 | α2 | β1 | γ4 |
| 226 | α2 | β1 | γ5 |
| 227 | α2 | β1 | γ6 |
| 228 | α2 | β1 | γ7 |
| 229 | α2 | β1 | γ8 |
| 230 | α2 | β1 | γ9 |
| 231 | α2 | β1 | γ10 |
| 232 | α2 | β1 | γ11 |
| 233 | α2 | β1 | γ12 |
| 234 | α2 | β1 | γ13 |
| 235 | α2 | β2 | γ1 |
| 236 | α2 | β2 | γ2 |
| 237 | α2 | β2 | γ3 |
| 238 | α2 | β2 | γ4 |
| 239 | α2 | β2 | γ5 |
| 240 | α2 | β2 | γ6 |

TABLE 4-2

Ligand Structure (continued)

| No. | Adamantyl Derivative Moiety | Cyclopentadienyl Derivative Moiety | Fluorenyl Derivative Moiety |
|---|---|---|---|
| 241 | α2 | β2 | γ7 |
| 242 | α2 | β2 | γ8 |
| 243 | α2 | β2 | γ9 |
| 244 | α2 | β2 | γ10 |
| 245 | α2 | β2 | γ11 |
| 246 | α2 | β2 | γ12 |
| 247 | α2 | β2 | γ13 |
| 248 | α2 | β3 | γ1 |
| 249 | α2 | β3 | γ2 |
| 250 | α2 | β3 | γ3 |
| 251 | α2 | β3 | γ4 |
| 252 | α2 | β3 | γ5 |
| 253 | α2 | β3 | γ6 |
| 254 | α2 | β3 | γ7 |

TABLE 4-2-continued

Ligand Structure (continued)

| No. | Adamantyl Derivative Moiety | Cyclopentadienyl Derivative Moiety | Fluorenyl Derivative Moiety |
|---|---|---|---|
| 255 | α2 | β3 | γ8 |
| 256 | α2 | β3 | γ9 |
| 257 | α2 | β3 | γ10 |
| 258 | α2 | β3 | γ11 |
| 259 | α2 | β3 | γ12 |
| 260 | α2 | β3 | γ13 |
| 261 | α2 | β4 | γ1 |
| 262 | α2 | β4 | γ2 |
| 263 | α2 | β4 | γ3 |
| 264 | α2 | β4 | γ4 |
| 265 | α2 | β4 | γ5 |
| 266 | α2 | β4 | γ6 |
| 267 | α2 | β4 | γ7 |
| 268 | α2 | β4 | γ8 |
| 269 | α2 | β4 | γ9 |
| 270 | α2 | β4 | γ10 |
| 271 | α2 | β4 | γ11 |
| 272 | α2 | β4 | γ12 |
| 273 | α2 | β4 | γ13 |
| 274 | α2 | β5 | γ1 |
| 275 | α2 | β5 | γ2 |
| 276 | α2 | β5 | γ3 |
| 277 | α2 | β5 | γ4 |
| 278 | α2 | β5 | γ5 |
| 279 | α2 | β5 | γ6 |
| 280 | α2 | β5 | γ7 |
| 281 | α2 | β5 | γ8 |
| 282 | α2 | β5 | γ9 |
| 283 | α2 | β5 | γ10 |
| 284 | α2 | β5 | γ11 |
| 285 | α2 | β5 | γ12 |
| 286 | α2 | β5 | γ13 |
| 287 | α2 | β6 | γ1 |
| 288 | α2 | β6 | γ2 |
| 289 | α2 | β6 | γ3 |
| 290 | α2 | β6 | γ4 |
| 291 | α2 | β6 | γ5 |
| 292 | α2 | β6 | γ6 |
| 293 | α2 | β6 | γ7 |
| 294 | α2 | β6 | γ8 |
| 295 | α2 | β6 | γ9 |
| 296 | α2 | β6 | γ10 |
| 297 | α2 | β6 | γ11 |
| 298 | α2 | β6 | γ12 |
| 299 | α2 | β6 | γ13 |
| 300 | α2 | β7 | γ1 |
| 301 | α2 | β7 | γ2 |
| 302 | α2 | β7 | γ3 |
| 303 | α2 | β7 | γ4 |
| 304 | α2 | β7 | γ5 |
| 305 | α2 | β7 | γ6 |
| 306 | α2 | β7 | γ7 |
| 307 | α2 | β7 | γ8 |
| 308 | α2 | β7 | γ9 |
| 309 | α2 | β7 | γ10 |
| 310 | α2 | β7 | γ11 |
| 311 | α2 | β7 | γ12 |
| 312 | α2 | β7 | γ13 |
| 313 | α2 | β8 | γ1 |
| 314 | α2 | β8 | γ2 |
| 315 | α2 | β8 | γ3 |
| 316 | α2 | β8 | γ4 |
| 317 | α2 | β8 | γ5 |
| 318 | α2 | β8 | γ6 |
| 319 | α2 | β8 | γ7 |
| 320 | α2 | β8 | γ8 |
| 321 | α2 | β8 | γ9 |
| 322 | α2 | β8 | γ10 |
| 323 | α2 | β8 | γ11 |
| 324 | α2 | β8 | γ12 |
| 325 | α2 | β8 | γ13 |
| 326 | α2 | β9 | γ1 |
| 327 | α2 | β9 | γ2 |

TABLE 4-2-continued

Ligand Structure (continued)

| No. | Adamantyl Derivative Moiety | Cyclopentadienyl Derivative Moiety | Fluorenyl Derivative Moiety |
|---|---|---|---|
| 328 | α2 | β9 | γ3 |
| 329 | α2 | β9 | γ4 |
| 330 | α2 | β9 | γ5 |
| 331 | α2 | β9 | γ6 |
| 332 | α2 | β9 | γ7 |
| 333 | α2 | β9 | γ8 |
| 334 | α2 | β9 | γ9 |
| 335 | α2 | β9 | γ10 |
| 336 | α2 | β9 | γ11 |
| 337 | α2 | β9 | γ12 |
| 338 | α2 | β9 | γ13 |
| 339 | α2 | β10 | γ1 |
| 340 | α2 | β10 | γ2 |
| 341 | α2 | β10 | γ3 |
| 342 | α2 | β10 | γ4 |
| 343 | α2 | β10 | γ5 |
| 344 | α2 | β10 | γ6 |
| 345 | α2 | β10 | γ7 |
| 346 | α2 | β10 | γ8 |
| 347 | α2 | β10 | γ9 |
| 348 | α2 | β10 | γ10 |
| 349 | α2 | β10 | γ11 |
| 350 | α2 | β10 | γ12 |
| 351 | α2 | β10 | γ13 |
| 352 | α2 | β11 | γ1 |
| 353 | α2 | β11 | γ2 |
| 354 | α2 | β11 | γ3 |
| 355 | α2 | β11 | γ4 |
| 356 | α2 | β11 | γ5 |
| 357 | α2 | β11 | γ6 |
| 358 | α2 | β11 | γ7 |
| 359 | α2 | β11 | γ8 |
| 360 | α2 | β11 | γ9 |
| 361 | α2 | β11 | γ10 |
| 362 | α2 | β11 | γ11 |
| 363 | α2 | β11 | γ12 |
| 364 | α2 | β11 | γ13 |
| 365 | α2 | β12 | γ1 |
| 366 | α2 | β12 | γ2 |
| 367 | α2 | β12 | γ3 |
| 368 | α2 | β12 | γ4 |
| 369 | α2 | β12 | γ5 |
| 370 | α2 | β12 | γ6 |
| 371 | α2 | β12 | γ7 |
| 372 | α2 | β12 | γ8 |
| 373 | α2 | β12 | γ9 |
| 374 | α2 | β12 | γ10 |
| 375 | α2 | β12 | γ11 |
| 376 | α2 | β12 | γ12 |
| 377 | α2 | β12 | γ13 |
| 378 | α2 | β13 | γ1 |
| 379 | α2 | β13 | γ2 |
| 380 | α2 | β13 | γ3 |
| 381 | α2 | β13 | γ4 |
| 382 | α2 | β13 | γ5 |
| 383 | α2 | β13 | γ6 |
| 384 | α2 | β13 | γ7 |
| 385 | α2 | β13 | γ8 |
| 386 | α2 | β13 | γ9 |
| 387 | α2 | β13 | γ10 |
| 388 | α2 | β13 | γ11 |
| 389 | α2 | β13 | γ12 |
| 390 | α2 | β13 | γ13 |
| 391 | α2 | β14 | γ1 |
| 392 | α2 | β14 | γ2 |
| 393 | α2 | β14 | γ3 |
| 394 | α2 | β14 | γ4 |
| 395 | α2 | β14 | γ5 |
| 396 | α2 | β14 | γ6 |
| 397 | α2 | β14 | γ7 |
| 398 | α2 | β14 | γ8 |
| 399 | α2 | β14 | γ9 |
| 400 | α2 | β14 | γ10 |
| 401 | α2 | β14 | γ11 |
| 402 | α2 | β14 | γ12 |
| 403 | α2 | β14 | γ13 |
| 404 | α2 | β15 | γ1 |
| 405 | α2 | β15 | γ2 |
| 406 | α2 | β15 | γ3 |
| 407 | α2 | β15 | γ4 |
| 408 | α2 | β15 | γ5 |
| 409 | α2 | β15 | γ6 |
| 410 | α2 | β15 | γ7 |
| 411 | α2 | β15 | γ8 |
| 412 | α2 | β15 | γ9 |
| 413 | α2 | β15 | γ10 |
| 414 | α2 | β15 | γ11 |
| 415 | α2 | β15 | γ12 |
| 416 | α2 | β15 | γ13 |
| 417 | α2 | β16 | γ1 |
| 418 | α2 | β16 | γ2 |
| 419 | α2 | β16 | γ3 |
| 420 | α2 | β16 | γ4 |
| 421 | α2 | β16 | γ5 |
| 422 | α2 | β16 | γ6 |
| 423 | α2 | β16 | γ7 |
| 424 | α2 | β16 | γ8 |
| 425 | α2 | β16 | γ9 |
| 426 | α2 | β16 | γ10 |
| 427 | α2 | β16 | γ11 |
| 428 | α2 | β16 | γ12 |
| 429 | α2 | β16 | γ13 |
| 430 | α2 | β17 | γ1 |
| 431 | α2 | β17 | γ2 |
| 432 | α2 | β17 | γ3 |
| 433 | α2 | β17 | γ4 |
| 434 | α2 | β17 | γ5 |
| 435 | α2 | β17 | γ6 |
| 436 | α2 | β17 | γ7 |
| 437 | α2 | β17 | γ8 |
| 438 | α2 | β17 | γ9 |
| 439 | α2 | β17 | γ10 |
| 440 | α2 | β17 | γ11 |
| 441 | α2 | β17 | γ12 |
| 442 | α2 | β17 | γ13 |
| 443 | α3 | β1 | γ1 |
| 444 | α3 | β1 | γ2 |
| 445 | α3 | β1 | γ3 |
| 446 | α3 | β1 | γ4 |
| 447 | α3 | β1 | γ5 |
| 448 | α3 | β1 | γ6 |
| 449 | α3 | β1 | γ7 |
| 450 | α3 | β1 | γ8 |
| 451 | α3 | β1 | γ9 |
| 452 | α3 | β1 | γ10 |
| 453 | α3 | β1 | γ11 |
| 454 | α3 | β1 | γ12 |
| 455 | α3 | β1 | γ13 |
| 456 | α3 | β2 | γ1 |
| 457 | α3 | β2 | γ2 |
| 458 | α3 | β2 | γ3 |
| 459 | α3 | β2 | γ4 |
| 460 | α3 | β2 | γ5 |
| 461 | α3 | β2 | γ6 |
| 462 | α3 | β2 | γ7 |
| 463 | α3 | β2 | γ8 |
| 464 | α3 | β2 | γ9 |
| 465 | α3 | β2 | γ10 |
| 466 | α3 | β2 | γ11 |
| 467 | α3 | β2 | γ12 |
| 468 | α3 | β2 | γ13 |
| 469 | α3 | β3 | γ1 |
| 470 | α3 | β3 | γ2 |
| 471 | α3 | β3 | γ3 |
| 472 | α3 | β3 | γ4 |
| 473 | α3 | β3 | γ5 |

TABLE 4-2-continued

Ligand Structure (continued)

| No. | Adamantyl Derivative Moiety | Cyclopentadienyl Derivative Moiety | Fluorenyl Derivative Moiety |
|---|---|---|---|
| 474 | α3 | β3 | γ6 |
| 475 | α3 | β3 | γ7 |
| 476 | α3 | β3 | γ8 |
| 477 | α3 | β3 | γ9 |
| 478 | α3 | β3 | γ10 |
| 479 | α3 | β3 | γ11 |
| 480 | α3 | β3 | γ12 |

TABLE 4-3

Ligand Structure (continued)

| No. | Adamantyl Derivative Moiety | Cyclopentadienyl Derivative Moiety | Fluorenyl Derivative Moiety |
|---|---|---|---|
| 481 | α3 | β3 | γ13 |
| 482 | α3 | β4 | γ1 |
| 483 | α3 | β4 | γ2 |
| 484 | α3 | β4 | γ3 |
| 485 | α3 | β4 | γ4 |
| 486 | α3 | β4 | γ5 |
| 487 | α3 | β4 | γ6 |
| 488 | α3 | β4 | γ7 |
| 489 | α3 | β4 | γ8 |
| 490 | α3 | β4 | γ9 |
| 491 | α3 | β4 | γ10 |
| 492 | α3 | β4 | γ11 |
| 493 | α3 | β4 | γ12 |
| 494 | α3 | β4 | γ13 |
| 495 | α3 | β5 | γ1 |
| 496 | α3 | β5 | γ2 |
| 497 | α3 | β5 | γ3 |
| 498 | α3 | β5 | γ4 |
| 499 | α3 | β5 | γ5 |
| 500 | α3 | β5 | γ6 |
| 501 | α3 | β5 | γ7 |
| 502 | α3 | β5 | γ8 |
| 503 | α3 | β5 | γ9 |
| 504 | α3 | β5 | γ10 |
| 505 | α3 | β5 | γ11 |
| 506 | α3 | β5 | γ12 |
| 507 | α3 | β5 | γ13 |
| 508 | α3 | β6 | γ1 |
| 509 | α3 | β6 | γ2 |
| 510 | α3 | β6 | γ3 |
| 511 | α3 | β6 | γ4 |
| 512 | α3 | β6 | γ5 |
| 513 | α3 | β6 | γ6 |
| 514 | α3 | β6 | γ7 |
| 515 | α3 | β6 | γ8 |
| 516 | α3 | β6 | γ9 |
| 517 | α3 | β6 | γ10 |
| 518 | α3 | β6 | γ11 |
| 519 | α3 | β6 | γ12 |
| 520 | α3 | β6 | γ13 |
| 521 | α3 | β7 | γ1 |
| 522 | α3 | β7 | γ2 |
| 523 | α3 | β7 | γ3 |
| 524 | α3 | β7 | γ4 |
| 525 | α3 | β7 | γ5 |
| 526 | α3 | β7 | γ6 |
| 527 | α3 | β7 | γ7 |
| 528 | α3 | β7 | γ8 |
| 529 | α3 | β7 | γ9 |
| 530 | α3 | β7 | γ10 |
| 531 | α3 | β7 | γ11 |
| 532 | α3 | β7 | γ12 |
| 533 | α3 | β7 | γ13 |

TABLE 4-3-continued

Ligand Structure (continued)

| No. | Adamantyl Derivative Moiety | Cyclopentadienyl Derivative Moiety | Fluorenyl Derivative Moiety |
|---|---|---|---|
| 534 | α3 | β8 | γ1 |
| 535 | α3 | β8 | γ2 |
| 536 | α3 | β8 | γ3 |
| 537 | α3 | β8 | γ4 |
| 538 | α3 | β8 | γ5 |
| 539 | α3 | β8 | γ6 |
| 540 | α3 | β8 | γ7 |
| 541 | α3 | β8 | γ8 |
| 542 | α3 | β8 | γ9 |
| 543 | α3 | β8 | γ10 |
| 544 | α3 | β8 | γ11 |
| 545 | α3 | β8 | γ12 |
| 546 | α3 | β8 | γ13 |
| 547 | α3 | β9 | γ1 |
| 548 | α3 | β9 | γ2 |
| 549 | α3 | β9 | γ3 |
| 550 | α3 | β9 | γ4 |
| 551 | α3 | β9 | γ5 |
| 552 | α3 | β9 | γ6 |
| 553 | α3 | β9 | γ7 |
| 554 | α3 | β9 | γ8 |
| 555 | α3 | β9 | γ9 |
| 556 | α3 | β9 | γ10 |
| 557 | α3 | β9 | γ11 |
| 558 | α3 | β9 | γ12 |
| 559 | α3 | β9 | γ13 |
| 560 | α3 | β10 | γ1 |
| 561 | α3 | β10 | γ2 |
| 562 | α3 | β10 | γ3 |
| 563 | α3 | β10 | γ4 |
| 564 | α3 | β10 | γ5 |
| 565 | α3 | β10 | γ6 |
| 566 | α3 | β10 | γ7 |
| 567 | α3 | β10 | γ8 |
| 568 | α3 | β10 | γ9 |
| 569 | α3 | β10 | γ10 |
| 570 | α3 | β10 | γ11 |
| 571 | α3 | β10 | γ12 |
| 572 | α3 | β10 | γ13 |
| 573 | α3 | β11 | γ1 |
| 574 | α3 | β11 | γ2 |
| 575 | α3 | β11 | γ3 |
| 576 | α3 | β11 | γ4 |
| 577 | α3 | β11 | γ5 |
| 578 | α3 | β11 | γ6 |
| 579 | α3 | β11 | γ7 |
| 580 | α3 | β11 | γ8 |
| 581 | α3 | β11 | γ9 |
| 582 | α3 | β11 | γ10 |
| 583 | α3 | β11 | γ11 |
| 584 | α3 | β11 | γ12 |
| 585 | α3 | β11 | γ13 |
| 586 | α3 | β12 | γ1 |
| 587 | α3 | β12 | γ2 |
| 588 | α3 | β12 | γ3 |
| 589 | α3 | β12 | γ4 |
| 590 | α3 | β12 | γ5 |
| 591 | α3 | β12 | γ6 |
| 592 | α3 | β12 | γ7 |
| 593 | α3 | β12 | γ8 |
| 594 | α3 | β12 | γ9 |
| 595 | α3 | β12 | γ10 |
| 596 | α3 | β12 | γ11 |
| 597 | α3 | β12 | γ12 |
| 598 | α3 | β12 | γ13 |
| 599 | α3 | β13 | γ1 |
| 600 | α3 | β13 | γ2 |
| 601 | α3 | β13 | γ3 |
| 602 | α3 | β13 | γ4 |
| 603 | α3 | β13 | γ5 |
| 604 | α3 | β13 | γ6 |
| 605 | α3 | β13 | γ7 |
| 606 | α3 | β13 | γ8 |

TABLE 4-3-continued

Ligand Structure (continued)

| No. | Adamantyl Derivative Moiety | Cyclopentadienyl Derivative Moiety | Fluorenyl Derivative Moiety |
|---|---|---|---|
| 607 | α3 | β13 | γ9 |
| 608 | α3 | β13 | γ10 |
| 609 | α3 | β13 | γ11 |
| 610 | α3 | β13 | γ12 |
| 611 | α3 | β13 | γ13 |
| 612 | α3 | β14 | γ1 |
| 613 | α3 | β14 | γ2 |
| 614 | α3 | β14 | γ3 |
| 615 | α3 | β14 | γ4 |
| 616 | α3 | β14 | γ5 |
| 617 | α3 | β14 | γ6 |
| 618 | α3 | β14 | γ7 |
| 619 | α3 | β14 | γ8 |
| 620 | α3 | β14 | γ9 |
| 621 | α3 | β14 | γ10 |
| 622 | α3 | β14 | γ11 |
| 623 | α3 | β14 | γ12 |
| 624 | α3 | β14 | γ13 |
| 625 | α3 | β15 | γ1 |
| 626 | α3 | β15 | γ2 |
| 627 | α3 | β15 | γ3 |
| 628 | α3 | β15 | γ4 |
| 629 | α3 | β15 | γ5 |
| 630 | α3 | β15 | γ6 |
| 631 | α3 | β15 | γ7 |
| 632 | α3 | β15 | γ8 |
| 633 | α3 | β15 | γ9 |
| 634 | α3 | β15 | γ10 |
| 635 | α3 | β15 | γ11 |
| 636 | α3 | β15 | γ12 |
| 637 | α3 | β15 | γ13 |
| 638 | α3 | β16 | γ1 |
| 639 | α3 | β16 | γ2 |
| 640 | α3 | β16 | γ3 |
| 641 | α3 | β16 | γ4 |
| 642 | α3 | β16 | γ5 |
| 643 | α3 | β16 | γ6 |
| 644 | α3 | β16 | γ7 |
| 645 | α3 | β16 | γ8 |
| 646 | α3 | β16 | γ9 |
| 647 | α3 | β16 | γ10 |
| 648 | α3 | β16 | γ11 |
| 649 | α3 | β16 | γ12 |
| 650 | α3 | β16 | γ13 |
| 651 | α3 | β17 | γ1 |
| 652 | α3 | β17 | γ2 |
| 653 | α3 | β17 | γ3 |
| 654 | α3 | β17 | γ4 |
| 655 | α3 | β17 | γ5 |
| 656 | α3 | β17 | γ6 |
| 657 | α3 | β17 | γ7 |
| 658 | α3 | β17 | γ8 |
| 659 | α3 | β17 | γ9 |
| 660 | α3 | β17 | γ10 |
| 661 | α3 | β17 | γ11 |
| 662 | α3 | β17 | γ12 |
| 663 | α3 | β17 | γ13 |
| 664 | α4 | β1 | γ1 |
| 665 | α4 | β1 | γ2 |
| 666 | α4 | β1 | γ3 |
| 667 | α4 | β1 | γ4 |
| 668 | α4 | β1 | γ5 |
| 669 | α4 | β1 | γ6 |
| 670 | α4 | β1 | γ7 |
| 671 | α4 | β1 | γ8 |
| 672 | α4 | β1 | γ9 |
| 673 | α4 | β1 | γ10 |
| 674 | α4 | β1 | γ11 |
| 675 | α4 | β1 | γ12 |
| 676 | α4 | β1 | γ13 |
| 677 | α4 | β2 | γ1 |
| 678 | α4 | β2 | γ2 |
| 679 | α4 | β2 | γ3 |
| 680 | α4 | β2 | γ4 |
| 681 | α4 | β2 | γ5 |
| 682 | α4 | β2 | γ6 |
| 683 | α4 | β2 | γ7 |
| 684 | α4 | β2 | γ8 |
| 685 | α4 | β2 | γ9 |
| 686 | α4 | β2 | γ10 |
| 687 | α4 | β2 | γ11 |
| 688 | α4 | β2 | γ12 |
| 689 | α4 | β2 | γ13 |
| 690 | α4 | β3 | γ1 |
| 691 | α4 | β3 | γ2 |
| 692 | α4 | β3 | γ3 |
| 693 | α4 | β3 | γ4 |
| 694 | α4 | β3 | γ5 |
| 695 | α4 | β3 | γ6 |
| 696 | α4 | β3 | γ7 |
| 697 | α4 | β3 | γ8 |
| 698 | α4 | β3 | γ9 |
| 699 | α4 | β3 | γ10 |
| 700 | α4 | β3 | γ11 |
| 701 | α4 | β3 | γ12 |
| 702 | α4 | β3 | γ13 |
| 703 | α4 | β4 | γ1 |
| 704 | α4 | β4 | γ2 |
| 705 | α4 | β4 | γ3 |
| 706 | α4 | β4 | γ4 |
| 707 | α4 | β4 | γ5 |
| 708 | α4 | β4 | γ6 |
| 709 | α4 | β4 | γ7 |
| 710 | α4 | β4 | γ8 |
| 711 | α4 | β4 | γ9 |
| 712 | α4 | β4 | γ10 |
| 713 | α4 | β4 | γ11 |
| 714 | α4 | β4 | γ12 |
| 715 | α4 | β4 | γ13 |
| 716 | α4 | β5 | γ1 |
| 717 | α4 | β5 | γ2 |
| 718 | α4 | β5 | γ3 |
| 719 | α4 | β5 | γ4 |
| 720 | α4 | β5 | γ5 |

TABLE 4-4

Ligand Structure (continued)

| No. | Adamantyl Derivative Moiety | Cyclopentadienyl Derivative Moiety | Fluorenyl Derivative Moiety |
|---|---|---|---|
| 721 | α4 | β5 | γ6 |
| 722 | α4 | β5 | γ7 |
| 723 | α4 | β5 | γ8 |
| 724 | α4 | β5 | γ9 |
| 725 | α4 | β5 | γ10 |
| 726 | α4 | β5 | γ11 |
| 727 | α4 | β5 | γ12 |
| 728 | α4 | β5 | γ13 |
| 729 | α4 | β6 | γ1 |
| 730 | α4 | β6 | γ2 |
| 731 | α4 | β6 | γ3 |
| 732 | α4 | β6 | γ4 |
| 733 | α4 | β6 | γ5 |
| 734 | α4 | β6 | γ6 |
| 735 | α4 | β6 | γ7 |
| 736 | α4 | β6 | γ8 |
| 737 | α4 | β6 | γ9 |
| 738 | α4 | β6 | γ10 |
| 739 | α4 | β6 | γ11 |

TABLE 4-4-continued

Ligand Structure (continued)

| No. | Adamantyl Derivative Moiety | Cyclopentadienyl Derivative Moiety | Fluorenyl Derivative Moiety |
|---|---|---|---|
| 740 | α4 | β6 | γ12 |
| 741 | α4 | β6 | γ13 |
| 742 | α4 | β7 | γ1 |
| 743 | α4 | β7 | γ2 |
| 744 | α4 | β7 | γ3 |
| 745 | α4 | β7 | γ4 |
| 746 | α4 | β7 | γ5 |
| 747 | α4 | β7 | γ6 |
| 748 | α4 | β7 | γ7 |
| 749 | α4 | β7 | γ8 |
| 750 | α4 | β7 | γ9 |
| 751 | α4 | β7 | γ10 |
| 752 | α4 | β7 | γ11 |
| 753 | α4 | β7 | γ12 |
| 754 | α4 | β7 | γ13 |
| 755 | α4 | β8 | γ1 |
| 756 | α4 | β8 | γ2 |
| 757 | α4 | β8 | γ3 |
| 758 | α4 | β8 | γ4 |
| 759 | α4 | β8 | γ5 |
| 760 | α4 | β8 | γ6 |
| 761 | α4 | β8 | γ7 |
| 762 | α4 | β8 | γ8 |
| 763 | α4 | β8 | γ9 |
| 764 | α4 | β8 | γ10 |
| 765 | α4 | β8 | γ11 |
| 766 | α4 | β8 | γ12 |
| 767 | α4 | β8 | γ13 |
| 768 | α4 | β9 | γ1 |
| 769 | α4 | β9 | γ2 |
| 770 | α4 | β9 | γ3 |
| 771 | α4 | β9 | γ4 |
| 772 | α4 | β9 | γ5 |
| 773 | α4 | β9 | γ6 |
| 774 | α4 | β9 | γ7 |
| 775 | α4 | β9 | γ8 |
| 776 | α4 | β9 | γ9 |
| 777 | α4 | β9 | γ10 |
| 778 | α4 | β9 | γ11 |
| 779 | α4 | β9 | γ12 |
| 780 | α4 | β9 | γ13 |
| 781 | α4 | β10 | γ1 |
| 782 | α4 | β10 | γ2 |
| 783 | α4 | β10 | γ3 |
| 784 | α4 | β10 | γ4 |
| 785 | α4 | β10 | γ5 |
| 786 | α4 | β10 | γ6 |
| 787 | α4 | β10 | γ7 |
| 788 | α4 | β10 | γ8 |
| 789 | α4 | β10 | γ9 |
| 790 | α4 | β10 | γ10 |
| 791 | α4 | β10 | γ11 |
| 792 | α4 | β10 | γ12 |
| 793 | α4 | β10 | γ13 |
| 794 | α4 | β11 | γ1 |
| 795 | α4 | β11 | γ2 |
| 796 | α4 | β11 | γ3 |
| 797 | α4 | β11 | γ4 |
| 798 | α4 | β11 | γ5 |
| 799 | α4 | β11 | γ6 |
| 800 | α4 | β11 | γ7 |
| 801 | α4 | β11 | γ8 |
| 802 | α4 | β11 | γ9 |
| 803 | α4 | β11 | γ10 |
| 804 | α4 | β11 | γ11 |
| 805 | α4 | β11 | γ12 |
| 806 | α4 | β11 | γ13 |
| 807 | α4 | β12 | γ1 |
| 808 | α4 | β12 | γ2 |
| 809 | α4 | β12 | γ3 |
| 810 | α4 | β12 | γ4 |
| 811 | α4 | β12 | γ5 |
| 812 | α4 | β12 | γ6 |
| 813 | α4 | β12 | γ7 |
| 814 | α4 | β12 | γ8 |
| 815 | α4 | β12 | γ9 |
| 816 | α4 | β12 | γ10 |
| 817 | α4 | β12 | γ11 |
| 818 | α4 | β12 | γ12 |
| 819 | α4 | β12 | γ13 |
| 820 | α4 | β13 | γ1 |
| 821 | α4 | β13 | γ2 |
| 822 | α4 | β13 | γ3 |
| 823 | α4 | β13 | γ4 |
| 824 | α4 | β13 | γ5 |
| 825 | α4 | β13 | γ6 |
| 826 | α4 | β13 | γ7 |
| 827 | α4 | β13 | γ8 |
| 828 | α4 | β13 | γ9 |
| 829 | α4 | β13 | γ10 |
| 830 | α4 | β13 | γ11 |
| 831 | α4 | β13 | γ12 |
| 832 | α4 | β13 | γ13 |
| 833 | α4 | β14 | γ1 |
| 834 | α4 | β14 | γ2 |
| 835 | α4 | β14 | γ3 |
| 836 | α4 | β14 | γ4 |
| 837 | α4 | β14 | γ5 |
| 838 | α4 | β14 | γ6 |
| 839 | α4 | β14 | γ7 |
| 840 | α4 | β14 | γ8 |
| 841 | α4 | β14 | γ9 |
| 842 | α4 | β14 | γ10 |
| 843 | α4 | β14 | γ11 |
| 844 | α4 | β14 | γ12 |
| 845 | α4 | β14 | γ13 |
| 846 | α4 | β15 | γ1 |
| 847 | α4 | β15 | γ2 |
| 848 | α4 | β15 | γ3 |
| 849 | α4 | β15 | γ4 |
| 850 | α4 | β15 | γ5 |
| 851 | α4 | β15 | γ6 |
| 852 | α4 | β15 | γ7 |
| 853 | α4 | β15 | γ8 |
| 854 | α4 | β15 | γ9 |
| 855 | α4 | β15 | γ10 |
| 856 | α4 | β15 | γ11 |
| 857 | α4 | β15 | γ12 |
| 858 | α4 | β15 | γ13 |
| 859 | α4 | β16 | γ1 |
| 860 | α4 | β16 | γ2 |
| 861 | α4 | β16 | γ3 |
| 862 | α4 | β16 | γ4 |
| 863 | α4 | β16 | γ5 |
| 864 | α4 | β16 | γ6 |
| 865 | α4 | β16 | γ7 |
| 866 | α4 | β16 | γ8 |
| 867 | α4 | β16 | γ9 |
| 868 | α4 | β16 | γ10 |
| 869 | α4 | β16 | γ11 |
| 870 | α4 | β16 | γ12 |
| 871 | α4 | β16 | γ13 |
| 872 | α4 | β17 | γ1 |
| 873 | α4 | β17 | γ2 |
| 874 | α4 | β17 | γ3 |
| 875 | α4 | β17 | γ4 |
| 876 | α4 | β17 | γ5 |
| 877 | α4 | β17 | γ6 |
| 878 | α4 | β17 | γ7 |
| 879 | α4 | β17 | γ8 |
| 880 | α4 | β17 | γ9 |
| 881 | α4 | β17 | γ10 |
| 882 | α4 | β17 | γ11 |
| 883 | α4 | β17 | γ12 |
| 884 | α4 | β17 | γ13 |

In the table above, the ligand structure in No. 53 refers to the combination of α1, β5, and γ1, the ligand structure in No. 66 refers to the combination of α1, β6, and γ1, the ligand structure in No. 183 refers to the combination of α1, β15, and γ1, and when $MQ_j$ in the metal moiety is $ZrCl_2$, they are each an example of the metallocene compounds below.

[Chem. 5]

No. 53

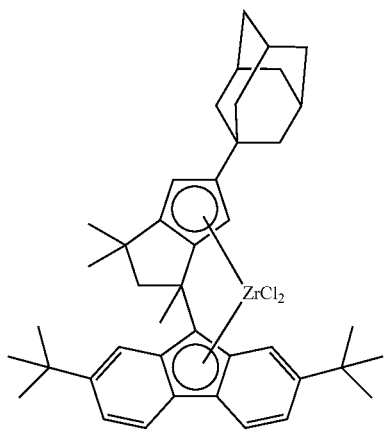

No. 66

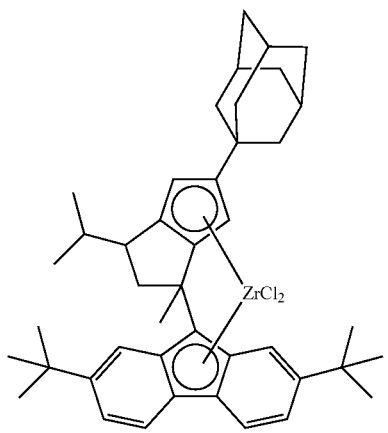

No. 183

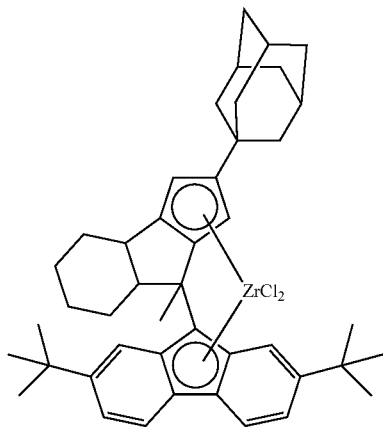

Specific examples of $MQ_j$ include $ZrCl_2$, $ZrBr_2$, $ZrMe_2$, $Zr(OTs)_2$, $Zr(OMs)_2$, $Zr(OTf)_2$, $TiCl_2$, $TiBr_2$, $TiMe_2$, $Ti(OTs)_2$, $Ti(OMs)_2$, $Ti(OTf)_2$, $HfCl_2$, $HfBr_2$, $HfMe_2$, $Hf(OTs)_2$, $Hf(OMs)_2$, and $Hf(OTf)_2$. Ts represents p-toluenesulfonyl group, Ms represents methanesulfonyl group, and Tf represents trifluoromethanesulfonyl group.

The metallocene compounds (A) of the present invention also include compounds corresponding to the above example compounds with the exception that "zirconium" is replaced with "hafnium" or "titanium" and metallocene compounds corresponding to the above example compounds with the exception that "dichloride" is replaced with "dimethyl" or "methylethyl".

[Compound (B)]

In the present invention, compound (B) is used as a component of the olefin polymerization catalyst. Compound (B) is at least one selected from (b-1) organoaluminum oxy-compound, (b-2) compound that forms an ion pair by reacting with the metallocene compound (A), and (b-3) organoaluminum compound. Among these, (b-1) organoaluminum oxy-compound is preferred in terms of efficiently producing an olefin polymer.

(Organoaluminum Oxy-Compound (b-1))

Examples of organoaluminum oxy-compound (b-1) include known conventional aluminoxanes such as a compound represented by Formula [B1] and a compound represented by Formula [B2], modified methylaluminoxane represented by Formula [B3], and boron-containing organoaluminum oxy-compound represented by Formula [B4].

[Chem. 6]

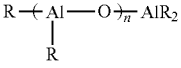

[B1]

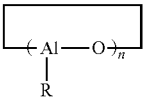

[B2]

In Formulae [B1] and [B2], R is a hydrocarbon group having 1 to 10 carbon atoms, preferably methyl group, and n is an integer of 2 or higher, preferably 3 or higher, and more preferably 10 or higher. In the present invention, methylaluminoxane, in which R in Formulae [B1] and [B2] is a methyl group, is preferably used.

[Chem. 7]

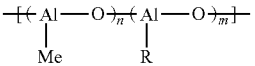

[B3]

In Formula [B3], R is a hydrocarbon group having 2 to 10 carbon atoms, and m and n are each independently an integer that is 2 or higher. A plurality of Rs may be the same or different from each other. The modified methylaluminoxane [B3] can be prepared using trimethylaluminum and alkylaluminum other than trimethylaluminum. The modified methylaluminoxane [B3] is commonly referred to as MMAO (modified methyl aluminoxane). Specifically, MMAO can be prepared using methods in U.S. Pat. Nos. 4,960,878 and 5,041,584.

Also, Tosoh Finechem Corporation, for example, commercially produces modified methylaluminoxane prepared by using trimethylaluminum and triisobutylaluminum (that is, R is isobutyl group in Formula [B3]) with trade names such as MMAO and TMAO.

MMAO is aluminoxane with improved solubility in various solvents and storage stability. Specifically, MMAO is soluble in aliphatic hydrocarbons, alicyclic hydrocarbons, and aromatic hydrocarbons unlike compounds that are insoluble or slightly soluble in benzenes such as the compounds represented by Formula [B1] or [B2].

[Chem. 8]

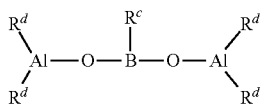

[B4]

In Formula [B4], $R^c$ is a hydrocarbon group having 1 to 10 carbon atoms. A plurality of $R^d$s are each independently a hydrogen atom, a halogen atom, or a hydrocarbon group having 1 to 10 carbon atoms. In the present invention, an olefin polymer can be produced in high temperatures as will be described later. Therefore, a feature of the present invention is that even organoaluminum oxy-compounds insoluble or slightly insoluble in benzene can be used as example of which is cited in JP-A-H02-78687.

Further, organoaluminum oxy-compounds described in JP-A-H02-167305, and aluminoxane having two or more types of alkyl groups described in JP-A-H02-247201 and JP-A-H03-103407 can also preferably be used.

Also, organoaluminum oxy-compounds that are "insoluble or slightly soluble in benzene" described above refer to organoaluminum oxy-compounds whose amount of dissolution in benzene of 60° C. is, in terms of Al atoms, usually 10 wt % or less, preferably 5 wt % or less, and particularly preferably 2 wt % or less.

In the present invention, the organoaluminum oxy-compound (b-1) as illustrated above may be used singly or two or more may be used in combination.

(Compounds (b-2) that Form an Ion Pair by Reacting with Crosslinked Metallocene Compounds (A))

Examples of compounds (b-2) that form an ion pair by reacting with crosslinked metallocene compounds (A) (hereinafter referred to as "ionic compounds (b-2)") include Lewis acids, ionic compounds, borane compounds, and carborane compounds cited in JP-A-H01-501950, JP-A-H01-502036, JP-A-H03-179005, JP-A-H03-179006, JP-A-H03-207703, JP-A-H03-207704, JP-A-2004-051676, U.S. Pat. No. 5,321,106, and the like. Further examples include heteropoly compounds and isopoly compounds. Among these, ionic compound (b-2) is preferably a compound represented by Formula [B5].

[Chem. 9]

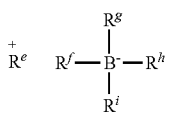

[B5]

In Formula [B5], examples of $R^{e+}$ include $H^+$, oxonium cation, carbenium cation, ammonium cation, phosphonium cation, cycloheptyltrienyl cation, and ferrocenium cation having a transition metal. $R^f$, $R^g$, $R^h$, and $R^i$ are each independently an organic group, preferably aryl group or halogen-substituted aryl group.

Examples of the above-mentioned carbenium cation include trisubstituted carbenium cations such as triphenylcarbenium cation, tris(methylphenyl)carbenium cation, and tris(dimethylphenyl)carbenium cation.

Examples of the ammonium cation include trialkylammonium cations such as trimethylammonium cation, triethylammonium cation, tri(n-propyl)ammonium cation, triisopropylammonium cation, tri(n-butyl)ammonium cation, and triisobutylammonium cation; N,N-dialkylanilinium cations such as N,N-dimethylanilinium cation, N,N-diethylanilinium cation, and N,N,2,4,6-pentamethylanilinium cation; and dialkylammonium cations such as diisopropylammonium cation and dicyclohexylammonium cation.

Examples of the phosphonium cation include triarylphosphonium cations such as triphenylphosphonium cation, tris(methylphenyl)phosphonium cation, and tris(dimethylphenyl)phosphonium cation. Among the above-mentioned examples, $R^{e+}$ is preferably carbenium cation or ammonium cation and particularly preferably triphenylcarbenium cation, N,N-dimethylanilinium cation, or N,N-diethylanilinium cation.

1. $R^{e+}$ is carbenium cation (carbenium salt)

Examples of carbenium salt include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate, and tris(3,5-dimethylphenyl)carbenium tetrakis(pentafluorophenyl)borate.

2. $R^{e+}$ is Ammonium Cation (Ammonium Salt)

Examples of ammonium salt include trialkylammonium salt, N,N-dialkylanilinium salt, and dialkylammonium salt.

Specific examples of trialkylammonium salt include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, and dioctadecylmethylammonium.

Specific examples of N,N-dialkylanilium salt include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N,2,4,6-pentamethylanilinium tetraphenylborate, and N,N,2,4,6-pentamethylanilinium tetrakis(pentafluorophenyl)borate.

Specific examples of dialkylammonium salt include diisopropylammonium tetrakis(pentafluorophenyl)borate and dicyclohexylammonium tetraphenylborate.

Ionic compounds (b-2) may be used singly, or two or more may be used in combination.

(Organoaluminum Compounds (b-3))

Examples of organoaluminum compounds (b-3) include organoaluminum compound represented by Formula [B6], and alkyl complex compounds of Group I metals and aluminum represented by Formula [B7].

$$R^a{}_m Al(OR^b)_n H_p X_q \quad [B6]$$

In Formula [B6], $R^a$ and $R^b$ are each independently a hydrocarbon group having 1 to 15 carbon atoms, preferably 1 to 4 carbon atoms, X is a halogen atom, m is a number satisfying $0<m\leq3$, n is a number satisfying $0\leq n\leq3$, p is a number satisfying $0\leq p<3$, q is a number satisfying $0\leq q<3$, and $m+n+p+q=3$.

$$M^2 AlR^a{}_4 \quad [B7]$$

In Formula [B7], $M^2$ is Li, Na, or K, and a plurality of $R^a$s are each independently hydrocarbon groups having 1 to 15 carbon atoms, preferably 1 to 4 carbon atoms.

Examples of organoaluminum compound [B6] include tri-n-alkylaluminum such as trimethylaluminum, triethylaluminum, tri-n-butylaluminum, trihexylaluminum, and trioctylaluminum; tri-branched alkylaluminum such as triisopropylaluminum, triisobutylaluminum, tri-sec-butylaluminum, tri-tert-butylaluminum, tri2-methylbutylaluminum, tri3-methylhexylaluminum, and tri2-ethylhexylaluminum; tricycloalkylaluminum such as tricyclohexylaluminum and tricyclooctylaluminum; triarylaluminum such as triphenylaluminum and tritolylaluminum; dialkylaluminum hydride such as diisopropylaluminum hydride and diisobutylaluminum hydride; alkenylaluminum such as isoprenylaluminum, represented by the formula $(i-C_4H_9)_x Al_y(C_5H_{10})_z$ (In the formula, x, y, and z are positive numbers and $z\leq 2x$.); alkylaluminum alkoxide such as isobutylaluminum methoxide and isobutylaluminum ethoxide; dialkylaluminum alkoxide such as dimethylaluminum methoxide, diethylaluminum ethoxide and dibutylaluminum butoxide; alkylaluminum sesquialkoxide such as ethylaluminum sesquiethoxide and butylaluminum sesquibutoxide; partially alkoxylated alkylaluminum having average composition represented by the formula $R^a{}_{2.5}Al(OR^b)_{0.5}$ (In the formula, $R^a$ and $R^b$ refer to the same $R^a$ and $R^b$ in Formula [B6].); alkylaluminum aryloxide including diethylaluminum phenoxide and diethylaluminum (2,6-di-tert-butyl-4-methylphenoxide); dialkylaluminum halide such as dimethylaluminum chloride, diethylaluminum chloride, dibutylaluminum chloride, diethylaluminum bromide, and diisobutylaluminum chloride; alkylaluminum sesquihalide such as ethylaluminum sesquichloride, butylaluminum sesquichloride and ethylaluminum sesquibromide; partially halogenated alkylaluminum including alkylaluminum dihalide such as ethylaluminum dichloride; partially hydrogenated alkylaluminum including dialkylaluminum hydride such as diethylaluminum hydride and dibutylaluminum hydride, and alkylaluminum dihydride such as ethylaluminum dihydride and propylaluminum dihydride; and partially alkoxylated or partially halogenated alkylaluminum such as ethylaluminum ethoxychloride, butylaluminum butoxychloride, and ethylaluminum ethoxybromide.

Examples of alkyl complex compound [B7] include LiAl$(C_2H_5)_4$ and LiAl$(C_7H_{15})_4$. Further, compounds similar to alkyl complex compound [B7] can also be used, and the examples include organoaluminum compounds having two or more aluminum compounds combined through a nitrogen atom, such as $(C_2H_5)_2AlN(C_2H_5)Al(C_2H_5)_2$.

Organoaluminum compounds (b-3) are preferably trimethylaluminum or triisobutylaluminum because they are readily available. Further, organoaluminum compounds (b-3) may be used singly, or two or more may be used in combination.

[Carrier (C)]

In the present invention, carrier (C) may be used as an olefin polymerization catalyst component. Carrier (C) is an inorganic or organic compound in the form of a granular or fine particulate solid.

(Inorganic Compound)

Examples of the inorganic compound include porous oxides, inorganic halides, clay minerals, clays (usually containing the clay minerals as main components), and ion-exchangeable layered compounds (Most clay minerals are ion-exchangeable layered compounds.). Examples of porous oxides include $SiO_2$, $Al_2O_3$, MgO, ZrO, $TiO_2$, $B_2O_3$, CaO, ZnO, BaO, and $ThO_2$; and complexes and mixtures containing these oxides. Examples of these complexes and mixtures include natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO. Among these, porous oxides with either one or both of $SiO_2$ and $Al_2O_3$ as the main components are preferred.

The porous oxides have different properties depending on the types and production processes, but they have a particle diameter of preferably 10 to 300 μm, and more preferably 20 to 200 μm; a specific surface area of preferably 50 to 1,000 m²/g, and more preferably 100 to 700 m²/g; a pore volume of preferably 0.3 to 3.0 cm³/g. These oxides are used after being calcined at 100 to 1,000° C., preferably at 150 to 700° C., where necessary. Examples of inorganic halides include $MgCl_2$, $MgBr_2$, $MnCl_2$, and $MnBr_2$. These inorganic halides may be used as they are or after being crushed with a ball mill or an oscillating mill. Further, the inorganic halides may be used after being dissolved in solvents such as alcohols and precipitated as fine particles with precipitating agents.

The clays, clay minerals, and ion-exchangeable layered compounds are not limited to natural products and may also be synthetic products. Also, the ion-exchangeable layered compounds are compounds having a crystal structure in which planes formed by bonds such as ionic bonds are stacked in parallel on top of one another with weak bond strength, and in which the ions contained therein are exchangeable.

Specific examples of the clays and the clay minerals include kaolin, bentonite, kibushi clay, gairome clay, allophane, hisingerite, pyrophyllite, mica such as synthetic mica, montmorillonite, vermiculite, chlorite, palygorskite, kaolinite, nacrite, dickite, hectorite, taeniolite, and halloysite; and examples of the ion-exchangeable layered compounds include ion crystalline compounds having layered crystal structures such as hexagonal closest packed structures, antimony structures, $CdCl_2$ structures, and $CdI_2$ structures. Specific examples of the ion-exchangeable layered compounds include crystalline acid salts of polyvalent metals such as α-Zr(HAsO$_4$)$_2$.H$_2$O, α-Zr(HPO$_4$)$_2$, α-Zr(KPO$_4$)$_2$.3H$_2$O, α-Ti(HPO$_4$)$_2$, α-Ti(HAsO$_4$)$_2$.H$_2$, α-Sn(HPO$_4$)$_2$.H$_2$O, γ-Zr(HPO$_4$)$_2$, γ-Ti(HPO$_4$)$_2$, and γ-Ti(NH$_4$PO$_4$)$_2$.H$_2$O.

It is preferable to subject the clays and the clay minerals to chemical treatments. Any chemical treatments may be used, with examples including a treatment to remove impurities on the surface and a treatment to modify the crystal structure of the clay. Specific examples of chemical treatments include acid treatments, alkali treatments, salt treatments, and organic treatments.

Further, the spaces between the layers in the ion-exchangeable layered compounds may be enlarged by exchanging the exchangeable ions between the layers with other larger and bulkier ions utilizing the ion exchange properties. Such bulky ions serve as columns to support the layered structures and are generally called pillars. For example, the oxide columns (pillars) can be formed through the intercalation of the metal hydroxide ions below between the layers of layered compounds followed by thermal dehydration. Also, the introduction of other substances between layers of layered compounds is called intercalation.

Examples of guest compounds to be intercalated include cationic inorganic compounds such as $TiCl_4$ and $ZrCl_4$; metal alkoxides such as $Ti(OR)_4$, $Zr(OR)_4$, $PO(OR)_3$, and $B(OR)_3$ (R is a hydrocarbon group or the like); and metal hydroxide ions such as $[Al_{13}O_4(OH)_{24}]^{7+}$, $[Zr_4(OH)_{14}]^{2+}$, and $[Fe_3O(OCOCH_3)_6]^+$. These guest compounds may be used singly, or two or more may be used in combination.

Further, the intercalation of the guest compounds may be carried out in the presence of polymers obtained by hydrolysis or polycondensation of metal alkoxides such as $Si(OR)_4$, $Al(OR)_3$, and $Ge(OR)_4$ (R is a hydrocarbon group or the like), or in the presence of colloidal inorganic compounds such as $SiO_2$.

Among the inorganic compounds, the clay minerals and the clays are preferable, especially montmorillonite, vermiculite, hectorite, taeniolite, and synthetic mica.

(Organic Compounds)

Examples of the organic compounds include granular or fine particulate solids with a particle diameter of 10 to 300 μm. Specific examples include (co)polymers synthesized with, as a main component, an α-olefin having 2 to 14 carbon atoms such as ethylene, propylene, 1-butene, or 4-methyl-1-pentene; (co)polymers synthesized with vinylcyclohexane or styrene as a main component; and the modified products of these polymers.

[Organic Compound Components (D)]

In the present invention, organic compound component (D) may be used as an olefin polymerization catalyst component. The organic compound component (D) is used, as needed, to improve the polymerization performance in a polymerization reaction of an α-olefin and to enhance the properties of the obtainable olefin polymers. Examples of the organic compound component (D) include alcohols, phenolic compounds, carboxylic acids, phosphorus compounds, and sulfonate salts.

<Use and Sequence of Addition of Components>

In olefin polymerization, the components may be used and added in appropriately selected manners and orders. For example, the components may be used and added by the methods as described below. In the following, the transition metal compound (A), the compound (B), the carrier (C) and the organic compound component (D) are also referred to as "components (A) to (D)", respectively.

(1) Method wherein the component (A) alone is added to a polymerization reactor.

(2) Method wherein the component (A) and the component (B) are added to a polymerization reactor in any order.

(3) Method wherein a catalyst component, in which the component (A) is supported on the component (C), and the component (B) are added to a polymerization reactor in any order.

(4) Method wherein a catalyst component, in which the component (B) is supported on the component (C), and component (A) are added to a polymerization reactor in any order.

(5) Method wherein a catalyst component in which the component (A) and the component (B) are supported on the component (C) is added to a polymerization reactor.

(6) Method wherein the component (A), the component (B) and the component (D) are added to a polymerization reactor in any order.

In each of the methods (2) to (6), two or more of the catalyst components may be brought into contact with each other beforehand. In each of the above methods (4) and (5), in which the component (B) is supported, an unsupported component (B) may be added in any order as necessary. In this case, the components (B) may be the same or different from each other. Further, an olefin may be prepolymerized on the solid catalyst component in which the component (A) is supported on the component (C), and the solid catalyst component in which the component (A) and the component (B) are supported on the component (C). Furthermore, an additional catalyst component may be supported on the prepolymerized solid catalyst component.

[1-Butene-Based (Co)Polymer Production Method]

The production method of 1-butene-based (co) polymers in the present invention comprises a step of (co)polymerizing monomers containing at least 1-butene in the presence of the olefin polymerization catalyst of the present invention at polymerization temperature of not less than 55° C. and not more than 200° C. and at polymerization pressure of not less than 0.1 MPaG and not more than 5.0 MPaG. The production method preferably comprises a step of (co)polymerizing 1-butene and optionally (an)other monomer(s) or comprises a step of (co)polymerizing 1-butene, an α-olefin having 2 or more carbon atoms (excluding 1-butene) and optionally (an)other monomer(s). Here, the term "(co)polymerization" is used as a collective term including homopolymerization and copolymerization. Further, the meaning of the phrase "olefins are (co)polymerized in the presence of the olefin polymerization catalyst" includes the embodiments in which olefins are (co)polymerized while the components of the olefin polymerization catalyst are added to a polymerization reactor in an appropriate manner as described in the above-mentioned methods (1) to (6).

(α-Olefins)

In the production method of the present invention, examples of the α-olefins having 2 or more carbon atoms, preferably 2 to carbon atoms, (excluding 1-butene) supplied for polymerization reaction include linear or branched α-olefins. Examples of the linear or branched α-olefins include ethylene, propylene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. Among those, an α-olefin having 2 to 10 carbon atoms is preferable, and ethylene and propylene are particularly preferable. The α-olefins may be used singly, or two or more may be used in combination.

When propylene is used for α-olefin, it may be used together with at least one olefin A selected from ethylene and α-olefins having 4 to 20 carbon atoms (excluding 1-butene) as required. The olefin A which may be used together with propylene is preferably at least one selected from ethylene and α-olefins having 4 to 10 carbon atoms (excluding 1-butene), of which examples include ethylene, 1-pentene, 3-methyl-1-butene, 1-hexene, 4-methyl-1-pentene, 3-methyl-1-pentene, 1-octene and 1-decene. In particular, it is more preferably at least one selected from ethylene, 1-butene, 1-hexene, 4-methyl-1-pentene and 1-octene, and even more preferably ethylene.

In the case of copolymerization, copolymerization of 1-butene, propylene and (an)other monomer(s) described below, copolymerization of 1-butene, ethylene and (an)other monomer(s), or copolymerization of 1-butene, propylene, ethylene and (an)other monomer(s) is preferable, and binary copolymerization of 1-butene and propylene, binary copolymerization of 1-butene and ethylene, or ternary copolymerization of 1-butene, propylene and ethylene is most preferable.

[Other Monomers]

According to the production method of the present invention, the polymerization may be performed in the presence of cyclic olefins, polar group-containing monomers, hydroxyl-terminated vinyl compounds, aromatic vinyl compounds and the like together with 1-butene in the reaction system. Further, the polymerization may involve polyenes. Additional components such as vinylcyclohexane may be copolymerized without departing from the spirit of the invention. These other monomers may be used in an amount of, for example 50 parts by weight or less, preferably 40 parts by weight or less, relative to 100 parts by weight of 1-butene. These other monomers may be used singly, or two or more may be used in combination.

Examples of the cyclic olefins include cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

Examples of the polar group-containing monomers include

α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic anhydride, and metal salts thereof such as sodium salts, potassium salts, lithium salts, zinc salts, magnesium salts, calcium salts and aluminum salts;

α,β-unsaturated carboxylate esters such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate;

vinyl esters such as vinyl acetate, vinyl propionate, vinyl caproate, vinyl caprate, vinyl laurate, vinyl stearate and vinyl trifluoroacetate; and unsaturated glycidyls such as glycidyl acrylate, glycidyl methacrylate and itaconic acid monoglycidyl ester.

Examples of the hydroxyl-terminated vinyl compounds include linear hydroxyl-terminated vinyl compounds such as hydroxylated-1-butene, hydroxylated-1-pentene, hydroxylated-1-hexene, hydroxylated-1-octene, hydroxylated-1-decene, hydroxylated-1-undecene, hydroxylated-1-dodecene, hydroxylated-1-tetradecene, hydroxylated-1-hexadecene, hydroxylated-1-octadecene and hydroxylated-1-eicosene; and branched hydroxyl-terminated vinyl compounds such as hydroxylated-3-methyl-1-butene, hydroxylated-3-methyl-1-pentene, hydroxylated-4-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene and hydroxylated-3-ethyl-1-hexene.

Examples of the aromatic vinyl compounds include styrene; mono- or polyalkylstyrenes such as o-methylstyrene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinyl benzyl acetate, hydroxystyrene, o-chlorostyrene, p-chlorostyrene and divinylbenzene; 3-phenylpropylene, 4-phenylpropylene and α-methylstyrene.

The polyenes are preferably selected from dienes and trienes. When polyene is used, in a preferred embodiment, the polyene is used in the range of 0.0001 to 1 mol % relative to all the olefins and monomers supplied to the polymerization reaction.

Examples of the dienes include α,ω-nonconjugated dienes such as 1,4-pentadiene, 1,5-hexadiene, 1,4-hexadiene, 1,4-octadiene, 1,5-octadiene, 1,6-octadiene, 1,7-octadiene and 1,9-decadiene; nonconjugated dienes such as ethylidenenorbornene, vinylnorbornene, dicyclopentadiene, 7-methyl-1,6-octadiene and 4-ethylidene-8-methyl-1,7-nonadiene; and conjugated dienes such as butadiene and isoprene. Of these, the α,ω-nonconjugated dienes and dienes having a norbornene skeleton are preferred.

Examples of the trienes include nonconjugated trienes such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6,-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecanediene; and conjugated trienes such as 1,3,5-hexatriene. Of these, nonconjugated trienes having a double bond at an end, 4,8-dimethyl-1,4,8-decatriene and 4-ethylidene-8-methyl-1,7-nonadiene (EMND) are preferable.

The dienes or trienes may be used singly, or two or more may be used in combination. Further, the dienes and the trienes may be used in combination. Of the polyenes, the α,ω-nonconjugated dienes and the polyenes having a norbornene skeleton are preferred.

((Co)Polymerization Method)

In the present invention, the polymerization may be carried out by any of liquid-phase polymerization methods such as solution polymerization and suspension polymerization, and gas-phase polymerization methods. Examples of inert hydrocarbon solvents used in the liquid-phase polymerization methods include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; and halogenated hydrocarbons such as ethylene chloride, chlorobenzene and dichloromethane. The inert hydrocarbon solvents may be used singly, or two or more may be used in combination. Also, the so-called bulk polymerization method may be used, in which the liquefied olefin supplied to the polymerization itself is used as the solvent.

[Formation of Olefin Polymerization Catalysts]

In the (co)polymerization using the olefin polymerization catalyst of the present invention, the components that may form the olefin polymerization catalyst may be used in the following amounts. In the olefin polymerization catalyst of the present invention, the contents of the components may be set as described below.

(1) In the (co)polymerization using olefin polymerization catalyst, the metallocene compound (A) is usually used in an amount of $10^{-9}$ to $10^{-1}$ mol, and preferably $10^{-8}$ to $10^{-2}$ mol per liter of the reaction volume.

(2) When the organoaluminum oxy-compound (b-1) is used as a component of the olefin polymerization catalyst, the compound (b-1) may be used in such an amount that the molar ratio [Al/M] of the aluminum atoms (Al) in the compound (b-1) to all the transition metal atoms (M) in the metallocene compound (A) is usually 0.01 to 5,000, and preferably 0.05 to 2,000.

(3) When the ionic compound (b-2) is used as a component of the olefin polymerization catalyst, the compound (b-2) may be used in such an amount that the molar ratio [(b-2)/M] of the compound (b-2) to all the transition metal atoms (M) in the metallocene compound (A) is usually 1 to 10, and preferably 1 to 5.

(4) When the organoaluminum compound (b-3) is used as a component of the olefin polymerization catalyst, the compound (b-3) may be used in such an amount that the molar ratio [(b-3)/M] of the compound (b-3) to all the transition metal atoms (M) in the metallocene compound (A) is usually 10 to 5,000, preferably 20 to 2,000.

(5) When the organic compound component (D) is used as a component of the olefin polymerization catalyst, the amount thereof may be such that, when the compound (B) is the organoaluminum oxy-compound (b-1), the molar ratio [(D)/(b-1)] of the organic compound component (D) to the compound (b-1) is usually 0.01 to 10, preferably 0.1 to 5; when the compound (B) is the ionic compound (b-2), the molar ratio [(D)/(b-2)] of the organic compound component (D) to the compound (b-2) is usually 0.01 to 10, preferably 0.1 to 5; when the compound (B) is the organoaluminum compound (b-3), the molar ratio [(D)/(b-3)] of the organic compound component (D) to the compound (b-3) is usually 0.01 to 2, preferably 0.005 to 1.

In the production method of the invention, the olefin polymerization temperature is usually 55 to 200° C., preferably 55 to 180° C., and particularly preferably 58 to 150° C. (in other words, particularly preferably a temperature at which industrial production is feasible). The polymerization pressure is usually not less than 0.1 MPaG and not more than 5.0 MPaG, preferably not less than 0.1 MPaG and not more than 4.0 MPaG, more preferably not less than 0.5 MPaG and not more than 4.0 MPaG. The polymerization reaction may be carried out batchwise, semi-continuously or continuously. The polymerization may be carried out in two or more stages under different reaction conditions. The polymerization is preferably performed in the presence of hydrogen. The molecular weight of the obtainable olefin (co)polymers containing structural units derived from 1-butene may be adjusted by hydrogen and so on in the polymerization system, by controlling the polymerization temperature, or by controlling the amount of the component (B) used.

According to the production method of the invention, olefin (co)polymers containing structural units derived from 1-butene which have high molecular weight can be produced efficiently, economically and stably and at a high productivity in such a manner that high catalytic activity is maintained even under industrially advantageous high-temperature conditions.

In particular, hydrogen is a preferred additive which may advance the polymerization activity of the catalyst and may increase or decrease the molecular weight of polymers produced. When hydrogen is added to the system, the amount thereof is appropriately about 0.00001 to 1000 NL per 1 mol of the 1-butene. The hydrogen concentration in the system may be controlled by adjusting the amount of hydrogen supplied, or also by performing a reaction in the system which generates or consumes hydrogen, by separating hydrogen with use of a membrane, or by discharging part of the gas containing hydrogen out of the system.

In the production method of an olefin (co)polymer containing structural units derived from 1-butene according to the present invention, when an α-olefin having 2 or more carbon atoms (excluding 1-butene) and optionally (an)other monomer(s) are used together with 1-butene, the supply ratio of 1-butene (B) to α-olefin having 2or more carbon atoms (excluding 1-butene) (O), as B:O (molar ratio), is usually 1:1000 to 1000:1, preferably1:500 to 500:1, more preferably 1:250 to 250:1, particularly preferably 1:100 to 100:1. It is preferred in terms of copolymerizability that the supply ratio of 1-butene to α-olefin having 2 or more carbon atoms (excluding 1-butene) is in the range described above. Here, 1-butene and α-olefin having 2 or more carbon atoms (excluding 1-butene) may each be preferably supplied to a polymerization reactor (polymerization reaction system) continuously or intermittently. The α-olefin having 2 or more carbon atoms (excluding 1-butene) (O) is in the total amount (total molar amount) of the α-olefins having 2 or more carbon atoms supplied for polymerization reaction other than 1-butene.

In the production method of an olefin (co)polymer containing structural units derived from 1-butene according to the present invention, it is preferred that (co)polymerization is performed by use of 1-butene alone or by use of 1-butene, α-olefin having 2 or more carbon atoms (excluding 1-butene) and optionally (an)other monomer(s), in the presence of hydrogen, and it is more preferred that (co)polymerization is performed by use of 1-butene alone or in a manner that the supply ratio of 1-butene (B) to α-olefin having 2 or more carbon atoms (excluding 1-butene) (O) is satisfied, in the presence of hydrogen. The supply amount of hydrogen (H) is preferably 0.001 normal liter/hr≤H≤1000 normal liter/hr. The supply amount of hydrogen (H) supplied into a polymerization reaction system is more preferably 0.01 normal liter/hr≤H≤500 normal liter/hr. The supply amount of hydrogen (H) supplied into a polymerization reaction system in the above range is preferable in terms of productivity improvement and molecular weight retention. Here, hydrogen may each be supplied to a polymerization reactor continuously or intermittently. The production method of the invention improves activity dramatically, especially in the presence of hydrogen. In other words, the production method of the present invention makes it easy to purify a high molecular weight substance, and hence makes it possible to significantly add hydrogen for the same molecular weight, compared to known production methods and known catalysts. Accordingly, a high polymerization activity is obtained especially in the presence of hydrogen, and the productivity of 1-butene-based (co)polymers is dramatically improved.

In the production method of an olefin (co)polymer containing structural units derived from 1-butene according to the present invention, the olefin polymerization activity is preferably 100 kg-polymer/mmol-M/hr or more and 50000 kg-polymer/mmol-M/hr or less, more preferably 130 kg-polymer/mmol-M/hr or more and 10000 kg-polymer/mmol-M/hr or less, particularly preferably 150kg-polymer/mmol-M/hr or more and 10000 kg-polymer/mmol-M/hr. M represents a Group 4 transition metal in Formula [I]. An olefin (co)polymer containing structural units derived from 1-butene in the above range is preferable in terms of reduction of Group 4 metal. According to the production method of the present invention, it is more preferred that copolymerization is performed in the presence of hydrogen while satisfying the above supply ratio of 1-butene (B) to α-olefin having 2 or more carbon atoms (excluding 1-butene) (O), the supply amount of hydrogen (H), and the above olefin polymerization activity.

Olefin (co)polymers containing structural units derived from 1-butene synthesized by the production method of the invention may be subjected to known post treatment steps such as a catalyst deactivation step, a residual catalyst removal step and a drying step as required.

[Olefin (Co)Polymer Containing Structural Units Derived from 1-Butene]

According to the invention, olefin (co)polymers containing structural units derived from 1-butene can be produced efficiently, economically and stably and at a high productivity, in the presence of an olefin polymerization catalyst including a metallocene compound having a special structure, by (co)polymerization of 1-butene alone, or of 1-butene, an α-olefin having 2 or more carbon atoms (excluding 1-butene) and/or (an)other monomer(s); preferably, by homopolymerization of 1-butene, by copolymerization of 1-butene and ethylene, or by copolymerization of 1-butene, propylene and optionally at least one olefin A selected from ethylene and α-olefin having 4 to 20 carbon atoms (excluding 1-butene).

Hereinafter, the properties of a homopolymer formed by using 1-butene, an olefin copolymer containing structural units derived from 1-butene obtained using 1-butene and ethylene, or an olefin copolymer containing structural units derived from 1-butene obtained using propylene and 1-butene, for example, a propylene-1-butene copolymer or a copolymer of propylene, 1-butene and a monomer other than the two monomers are described.

In the present invention, at least part of olefins supplied for polymerization reaction is 1-butene, which may be used, as required, together with one or more olefins selected from propylene, ethylene, and an α-olefin having 4 to 10 carbon atoms (excluding 1-butene), and (an)other monomer(s). An olefin used together with 1-butene is more preferably ethylene, propylene, 1-hexene, 4-methyl-1-pentene or 1-octene, and particularly preferably at least one of the olefins is ethylene or propylene.

In an embodiment 1, a 1-butene-based copolymer obtained according to the production method of the present invention is a 1-butene-based copolymer (1) obtained by copolymerization of at least a 1-butene and a propylene, optionally an α-olefin having 2 or more carbon atoms (excluding 1-butene and propylene) and optionally (an)other monomer(s). The copolymer includes at least structural units derived from 1-butene, includes the total content of structural units derived from ethylene and an α-olefin having 4 or more carbon atoms (including 1-butene) in the range of not less than 8 mol % and not more than 50 mol %, and includes structural units derived from propylene in the range of not less than 50 mol % and not more than 92 mol %. However, the total of the content of structural units derived from ethylene and an α-olefin having 4 or more carbon atoms (including 1-butene) and the content of structural units derived from propylene is 100 mol %. The 1-butene-based copolymers in the above range of the structural units have excellent forming properties.

The melting point (Tm) obtained from DSC (differential scanning calorimetry) of the 1-butene-based copolymer (1) in the embodiment 1 described above is not less than 50° C. and less than 110° C., or the peak melting point is not observed from DSC. More preferably, the melting point (Tm) obtained from DSC is not less than 55° C. and less than 110° C., or the peak melting point is not observed from DSC, and particularly preferably, it is not less than 60° C. and less than 110° C., or the peak melting point is not observed from DSC. Here, "melting point is not observed" refers to no observation of a crystalline melting peak of not less than 1 J/g as heat of crystal fusion in the range of −150 to 200° C. In the case where a plurality of crystal melting peaks are observed, the peak at the highest temperature is assigned to the melting point. The application of 1-butene-based polymers of which the melting point (Tm) is within the above-mentioned range to molded articles such as film results in an excellent low heat sealability.

In one of the preferred embodiments in an embodiment 1 of the 1-butene-based copolymer, the 1-butene-based copolymer is obtained by copolymerization of at least a 1-butene and propylene and optionally (an)other monomer(s), and when the total content of structural units derived from 1-butene (B) and structural units derived from propylene (P) is 100 mol %, their contents are 10 mol % ≤B ≤49 mol % and 51 mol %≤P≤90 mol %, preferably 15 mol %≤B≤48 mol % and 52 mol %≤P≤85 mol %, more preferably 20 mol %≤B≤47 mol % and 53 mol %≤P≤80 mol %. The olefin copolymers containing structural units derived from 1-butene which have structural units derived from 1-butene and structural units derived from propylene in the above-described range have excellent forming properties.

The intrinsic viscosity [η] in decalin at 135° C. for a 1-butene-based copolymer of the preferred embodiment is preferably 1.3(dl/g)≤[η]≤10(dl/g), more preferably 1.3 (dl/g)≤[η]≤9 (dl/g), particularly preferably 1.35 (dl/g)≤[η]≤7 (dl/g). The olefin copolymers containing structural units derived from 1-butene which have the intrinsic viscosity [η] in the above range have excellent forming properties.

Other preferred embodiments in an embodiment 1 of the 1-butene-based copolymer obtained according to the production method of the present invention include a copolymer in which the 1-butene-based copolymer is obtained by copolymerization of at least a 1-butene, propylene and ethylene, and optionally (an)other monomer(s). When the total content of structural units derived from 1-butene (B), structural units derived from propylene (P) and structural units derived from ethylene (E) is 100 mol %, the 1-butene-based copolymer contains preferably 4 mol %≤B≤45 mol %, 51 mol %≤P≤92 mol % and 4 mol %≤E≤45 mol %;

more preferably 4 mol %≤B≤31 mol %, 65 mol %≤P≤92 mol % and 4 mol %≤E≤31 mol %;

still more preferably 5 mol %≤B≤30 mol %, 65 mol %≤P≤90 mol % and 5 mol %≤E≤30 mol %; and particularly preferably 5 mol %≤B≤25 mol %, 65 mol %≤P≤85 mol % and 10 mol %≤E≤20 mol %. The olefin copolymers containing structural units derived from 1-butene which have the above-mentioned structural units in the above range have excellent forming properties.

The intrinsic viscosity [η] indecalinat 135° C. for an olefin copolymer containing structural units derived from 1-butene in the embodiment 1 described above is preferably 1.3 (dl/g)≤[η]≤10 (dl/g), more preferably 1.4 (dl/g)≤[η]≤9 (dl/g), particularly preferably 1.5 (dl/g)≤[η]≤7 (dl/g). The olefin (co)polymers containing structural units derived from 1-butene in the above range have excellent forming properties.

In an embodiment 2, a 1-butene-based (co)polymer obtained according to the production method of the present invention is a 1-butene-based (co)polymer (2) obtained by (co)polymerization of at least a 1-butene, optionally an α-olefin having 2 or more carbon atoms (excluding 1-butene) and optionally (an)other monomer(s). The (co)polymer includes at least structural units derived from 1-butene, includes the content of structural units derived from 1-butene in the range of more than 50 mol % and 100 mol % or less, and includes the total of structural units derived from an α-olefin having 2 or more carbon atoms (excluding 1-butene) in the range of 0 mol % or more and less than 50 mol %. However, the total of the content of structural units derived from 1-butene and the content of structural units derived from an α-olefin having 2 or more carbon atoms (excluding 1-butene) is 100 mol %. The 1-butene-based (co)polymers in the above range of the structural units have excellent forming properties.

Although the melting point (Tm) obtained from DSC (differential scanning calorimetry) of a 1-butene-based (co)polymer (2) of the embodiment 2 described above is not particularly restricted, preferably, the melting point is not less than 50° C. and less than 130° C., or the peak melting point is not observed from DSC; more preferably, the melting point is not less than 55° C. and less than 130° C., or the peak melting point is not observed from DSC; and particularly preferably, the melting point is not less than 60° C. and less than 130° C., or the peak melting point is not observed from DSC. Here, "melting point is not observed" refers to no observation of a crystalline melting peak of not less than 1 J/g as a crystalline melting calorie in the range of −150 to 200° C. In the case where a plurality of crystal melting peaks are observed, the peak at the highest temperature is assigned to the melting point. The application of olefin (co)polymers containing structural units derived from 1-butene in the above-mentioned range of the melting point (Tm) to molded articles such as film results in an excellent low temperature heat sealability.

In one of the preferred embodiments in an embodiment 2 of the 1-butene-based (co)polymer, the 1-butene-based (co)polymer is a homopolymer of 1-butene.

In addition, in another of the preferred embodiments in an embodiment 2 of the 1-butene-based (co)polymer, the 1-butene-based copolymer is obtained by copolymerization of at least a 1-butene and propylene and optionally (an)other monomer(s) and when the total content of structural units derived from 1-butene (B) and structural units derived from propylene (P) is 100 mol %, their contents are 51 mol %≤B≤95 mol % and 5 mol %≤P≤49 mol %, preferably 55 mol %≤B≤85 mol % and 15 mol %≤P≤45 mol %, more preferably 60 mol %≤B≤80 mol % and 20 mol %≤P≤40 mol %. The olefin copolymers containing structural units derived from 1-butene which have structural units derived from 1-butene and structural units derived from propylene in the above-described range have excellent forming properties. The intrinsic viscosity [η] in decalin at 135° C. for a 1-butene-based copolymer of the preferred embodiment is preferably 1.3 (dl/g) ≤[η]≤10 (dl/g), more preferably 1.4 (dl/g)≤[η]≤9 (dl/g), particularly preferably 1.5 (dl/g)≤[η]≤7 (dl/g). The 1-butene-based copolymers which have the intrinsic viscosity [η] in the above range have excellent forming properties.

In another of the preferred embodiments in an embodiment 2 of the 1-butene-based (co)polymer, the 1-butene-based copolymer is obtained by copolymerization of at least a 1-butene and ethylene and optionally (an)other monomer(s), and when the total content of structural units derived from 1-butene (B) and structural units derived from ethylene (E) is 100 mol %, their contents are 51 mol % ≤B≤95 mol % and 5 mol %≤E≤49 mol %, preferably 55 mol %≤B ≤85 mol % and 15 mol %≤E≤45 mol %, more preferably 60 mol % and 15 mol %≤E≤40 mol %. The olefin copolymers containing structural units derived from 1-butene which have structural units derived from 1-butene and structural units derived from ethylene in the above-described range have excellent forming properties. The intrinsic viscosity [η] in decalin at 135° C. for a 1-butene-based copolymer of the preferred embodiment is preferably 1.3 (dl/g)≤[η]≤10 (dl/g), more preferably 1.4 (dl/g)≤[η]≤9 (dl/g), particularly preferably 1.5 (dl/g)≤[η]≤7 (dl/g). The olefin copolymers containing structural units derived from 1-butene which have the intrinsic viscosity [η] in the above range have excellent forming properties.

In addition, according to the production method of the invention, 1-butene-based (co)polymers can be produced in a preferred manner which have a high molecular weight and a melting point high to some degree, efficiently, economically and stably and at a high productivity under high temperature which is advantageous in industrial processes.

Although the molecular weight of the olefin (co)polymers containing structural units derived from 1-butene of the invention is not particularly restricted, the melt mass-flow rate (MFR) as measured (at 230° C. under 2.16 kg load) in accordance with ASTM D 1238 is in the range of preferably 0.1 (g/10 minutes)≤MFR≤150 (g/10 minutes), more preferably 0.1 (g/10 minutes)≤MFR≤100 (g/10 minutes), still more preferably 1.0 (g/10 minutes)≤MFR≤50 (g/10 minutes), particularly preferably 2.0 (g/10 minutes)≤MFR≤30 (g/10 minutes). The olefin (co)polymers containing structural units derived from 1-butene which have the MFR in the above range have excellent forming properties.

EXAMPLES

The present invention will be described in further detail based on examples hereinbelow. However, the scope of the invention is not limited to such examples.

First of all, the methods of measuring the properties of the olefin (co)polymers containing structural units derived from 1-butene are described.

[Melting Point (Tm), Heat of Fusion (ΔH) and Crystallization Temperature (Tc)]

The melting point (Tm) and the crystallization temperature (Tc) of olefin (co)polymers containing structural units derived from 1-butene were measured with DSC Pyris 1 or DSC 7 manufactured by Perkin Elmer Co., Ltd., in the following manner.

A sample of approximately 5 mg was taken in a nitrogen atmosphere (20 mL/min): (1) the sample was heated to 230° C. and was held at the temperature for 10 minutes, and (2) it was cooled to 30° C. at 10° C./min, and was held at 30° C. for 1 minute, and then (3) it was heated to 230° C. at 10° C./min. The melting point (Tm) was calculated from the peak top of the crystal melting peak observed during the heating process of (3), and the crystallization temperature (Tc) was calculated from the peak top of the crystallization peak observed during the cooling process of (2). In the case where a plurality of crystal melting peaks were observed in the olefin (co)polymers containing structural units derived from 1-butene described in the Examples and Comparative Examples (for example, a peak Tm1 at a lower temperature side, a peak Tm2 at a higher temperature side), they were recorded together, or the peak at the highest temperature was assigned to the melting point (Tm) of the olefin (co)polymers containing structural units derived from 1-butene. The heat of fusion (ΔH) was calculated based on measuring the crystal melting peak and the area of the melting curve.

For data recorded as "after stabilization of crystal", using DSC Pyris 1 or DSC 7 manufactured by Perkin Elmer Co., Ltd. in the same way as above-described, a sample (approximately 5 mg) in a nitrogen atmosphere (20 mL/min) was heated to 220° C., held at 220° C. for 10 minutes, then cooled to room temperature, and left to stand at room temperature for 10 days or more, after which the melting point (Tm) and the heat of fusion (ΔH) were measured in the following manner.

A sample of approximately 5 mg was taken in a nitrogen atmosphere (20 mL/min):

(1) the sample was cooled from room temperature to −20° C. at 20° C./min and was held at −20° C. for 10 minutes, (2) and was heated to 200° C. at 20° C./min. The melting point (Tm) was calculated from the peak top of the crystal melting peak observed during the heating process of (2), and the heat of fusion (ΔH) was calculated based on measuring the area of the melting curve.

[Intrinsic Viscosity ([η])]

The intrinsic viscosity [η] of an olefin (co)polymer containing structural units derived from 1-butene is a value which is measured using decalin solvent at 135° C. In other words, the granular pellets of olefin (co)polymers containing structural units derived from 1-butene (approximately 20 mg) were dissolved in the decalin solvent (15 ml), and the specific viscosity η sp was measured in the oil bath of 135° C. The decalin solution was further diluted by adding 5 ml of decalin solvent, from which the specific viscosity η sp was measured as described above. Two more dilutions were iterated in the same manner. The value of η sp/C, which is obtained by extrapolating the concentration of olefin (co) polymers containing structural units derived from 1-butene (C) to zero, is defined as the intrinsic viscosity [η] of the olefin (co)polymers containing structural units derived from 1-butene.

Intrinsic viscosity [η]=lim (η sp/C) (C→0) [MFR (melt flow rate)]

MFR was measured in accordance with ASTM D 1238 (at 230° C. under 2.16 kg load)

[Weight-Average Molecular Weight (Mw), Number-Average Molecular Weight (Mn) and Molecular Weight Distribution (Mw/Mn)]

The weight-average molecular weight (Mw), number-average molecular weight (Mn) and molecular weight distribution (Mw/Mn) were measured with Alliance GPC-2000, a gel permeation chromatograph manufactured by Waters, as follows. For separation columns, two TSK gel GNH6-HT and two TSK gel GNH6-HTL were used, with each 7.5 mm in diameter and 300 mm in length. Column temperature was set at 140° C. o-Dichlorobenzene (Wako Pure Chemical Industries, Ltd.) was used for mobile phase, and 0.025 wt % of BHT (Takeda Pharmaceutical Company Ltd.) was used as antioxidant. The mobile phase was pumped at a flow rate of 1.0 ml/min, and the sample concentration was set at 15 mg/10 ml. 500 microliters of sample solution was pumped, and differential refractometer was used as detector. Standard polystyrenes manufactured by Tosoh Corporation were used for weight-average molecular weight (Mw) of Mw<1,000 and Mw>4×10⁶. Standard polystyrenes manufactured by Pressure Chemical were used for weight-average molecular weight (Mw) of 1,000≤Mw≤4×10⁶. The molecular weight distribution (Mw/Mn) and various average molecular weights were converted into molecular weights of polystyrene by a universal calibration method.

[Measurement of Ethylene Content (E), Propylene Content (P) and 1-Butene Content (B)]

A nuclear magnetic resonance apparatus, model AVANCE III cryo-500, manufactured by Bruker BioSpin Corporation was used for calculation at $^{13}$C-NMR with reference to the method described in Macromolecules, 10 (1977) p. 773-778 and Macromolecules, 37 (2004) p. 2471-2477.

Alternatively, with a Fourier transform infrared spectrophotometer FT/IR-610 manufactured by JASCO Corporation, the area in the vicinity of 1155 cm$^{-1}$ ascribed to the lateral vibration of the methyl group of propylene and the absorbance in the vicinity of 4325 cm$^{-1}$ ascribed to the overtone absorption due to the C—H stretching vibration were determined. From the ratio of these parameters, the ethylene content, propylene content and 1-butene content were calculated with reference to a calibration curve. The calibration curve had been prepared using standard samples standardized by $^{13}$C-NMR.

[Measurement of Zirconium Content in Supported Catalysts]

The zirconium content in supported catalysts was measured with an ICP emission spectrophotometer (ICPS-8100) manufactured by Shimadzu Corporation. The sample was wet decomposed with sulfuric acid and nitric acid, and was made to have a constant volume (during this step, filtration and dilution were performed as required), to give a sample liquid. A prescribed amount of the sample liquid was analyzed, and the zirconium content was determined based on a calibration curve prepared with standard samples having known concentrations.

[Identification of the Target Compound]

The structures of metallocene compounds obtained in Synthesis Examples were determined by methods such as 270 MHz $^1$H-NMR (GSH-270 manufactured by JEOL Ltd.) and FD-MS (SX-102A manufactured by JEOL Ltd.).

[Synthesis Examples of Metallocene Compounds]

The catalysts used in these Synthesis Examples may be synthesized in methods described in the following patent documents. Specific examples are JP-A-2000-212194, JP-A-2004-168744, JP-A-2004-189666, JP-A-2004-161957, JP-A-2007-302854, JP-A-2007-302853, WO 01/027124 pamphlet, and the like.

Synthesis Example 1

Synthesis of Catalyst (a):

[Chem. 10]

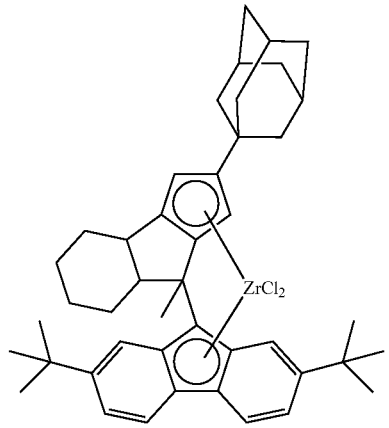

Synthesis Example 1-1

Synthesis of Ligand (a-1)

In a nitrogen atmosphere, 2,7-di-tert-butylfluorene (2.0 g, 7.18 mmol) was dissolved in tBuOMe (150 ml) and cooled to −10° C. in an ice water bath. To this, 1.65 M n-butyl lithium hexane solution (4.80 ml, 7.92 mmol) was slowly added, and gradually heated to 50° C. and stirred for 2 hours. The resultant mixture was again cooled to −10° C., and (3r,5r,7r)-1-(8-methyl-3b,4,5,6,7,7a-hexahydro-cyclopenta[a]-inden-2-yl)adamantane (2.45 g, 8.6 mmol) was added, which was then slowly heated to room temperature and stirred at 50° C. for 2 hours. The reaction vessel was cooled in an ice water bath, aqueous saturated ammonium chloride solution was added, and organic matter was extracted twice with hexane. The organic layer was washed with aqueous saturated sodium hydrogen carbonate solution and saturated brine, and was dried with anhydrous magnesium sulfate and filtered. The organic layer was concentrated, and 3 ml of methylene chloride was added, which was then added dropwise to 250 ml of stirred methanol. The obtained precipitates were filtered by a filter manufactured by Kiriyama, and the residue was washed with methanol. The washed powder obtained was dried under reduced pressure at 40° C. to give 1.3 g (yield of 31%) of the target compound. The compound was identified to be the target compound based on the results of the $^1$H-NMR (CDCl$_3$) and FD-MS measurements.

FD-MS: M/Z=584 (M$^+$)

Synthesis Example 1-2

Synthesis of Catalyst (a)

In a nitrogen atmosphere, the ligand (a-1) obtained in the Synthesis Example 1-1 (0.5 g, 0.85 mmol), toluene (40 ml) and THF (1 ml) were mixed together and cooled to −78° C. To this, 1.63 M n-butyl lithium hexane solution (1.1 ml, 1.80 mmol) was slowly added, and the resultant mixture was stirred at 50° C. for 4 hours. After cooling to room temperature, the reaction solvent was evaporated under reduced pressure, and hexane (40 ml) was added and cooled to −78° C. ZrCl$_4$ (0.20 g, 0.85 mmol) was added to this, and the resulting mixture was gradually heated to room temperature and stirred overnight. The reaction solvent was then concentrated and hexane was added to the residue, of which the insolubles were filtered through Celite filter. After the remaining solvent was concentrated, hexane was added again and dissolved, and was settled after cooling the temperature to −30° C. The residue obtained was filtered, and was washed with hexane and dried. The target compound obtained thereof was 90 mg in amount, and 12% in yield. The compound was identified to be the target compound based on the results of the $^1$H-NMR (CDCl$_3$) and FD-MS measurements.

$^1$H-NMR (ppm, CDCl$_3$): 7.8-6.0 (6H), 4.1-3.4 (2H), 2.3-1.0 (46H), FD-MS: M/Z=742 (M$^+$)

Synthesis Example 2

Synthesis of Catalyst (b):

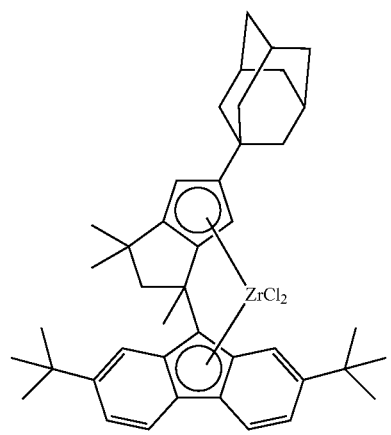

[Chem. 11]

Synthesis Example 2-1

Synthesis of Ligand (b-1)

In a nitrogen atmosphere, 2,7-di-tert-butylfluorene (1.66 g, 5.96 mmol) was dissolved in tBuOMe (150 ml) and cooled to −10° C. in an ice water bath. To this, 1.63 M n-butyl lithium hexane solution (3.84 ml, 6.26 mmol) was slowly added, and gradually heated to 50° C. and stirred for 2 hours. The resultant mixture was again cooled to −10° C., and 5-adamantyl-1,1-dimethyl-3-methyl-1,2-dihydropentalene (1.87 g, 6.67 mmol) was added, which was then slowly heated to room temperature and stirred at 50° C. for 4 hours. The reaction vessel was cooled in an ice water bath, aqueous saturated ammonium chloride solution was added, and organic matter was extracted twice with hexane. The organic layer was washed with aqueous saturated sodium hydrogen carbonate solution and saturated brine, and was dried with anhydrous magnesium sulfate and filtered. After the condensation of the organic layer, 3 ml of methylene chloride was added, and was added dropwise to 250 ml of stirred methanol. The obtained precipitates were filtered by a filter manufactured by Kiriyama, and the residue was washed with methanol. The washed powder obtained was dried under reduced pressure at 40° C. to give 2.64 g (yield of 79%) of the target compound. The compound was identified to be the target compound based on the results of the $^1$H-NMR (CDCl$_3$) and FD-MS measurements.

FD-MS: m/Z=558 (M$^+$)

Synthesis Example 2-2

Synthesis of Catalyst (b)

In a nitrogen atmosphere, the ligand (b-1) obtained in the Synthesis Example 2-1 (2.64 g, 4.72 mmol), toluene (156 ml) and THF (4 ml) were mixed together and cooled to −78° C. To this, 1.63 M n-butyl lithium hexane solution (6.09 ml, 9.91 mmol) was slowly added and gradually heated to room temperature. It was stirred overnight. After stirring overnight, it was heated to reach 50° C. and further stirred for 4 hours. After cooling to room temperature, the reaction solvent was evaporated under reduced pressure, and hexane (160 ml) was added and cooled to −78° C. ZrCl$_4$ (1.10 g, 4.72 mmol) was added to this, and the resultant mixture was gradually heated to room temperature and stirred overnight. The reaction solvent was concentrated and hexane was added to the residue, of which the insolubles were filtered through Celite filter. After the remaining solvent was concentrated, hexane was added again and dissolved, and was settled after cooling the temperature to −30° C. The residue obtained was filtered, and was washed with hexane and dried. The target compound obtained thereof was 1.15 g in amount, and 34% in yield. The compound was identified to be the target compound based on the results of the $^1$H-NMR (CDCl$_3$) and FD-MS measurements.

$^1$H-NMR (ppm, CDCl$_3$): 7.9-7.3 (6H), 6.0 (1H), 5.2 (1H), 4.0-3.9 (1H), 2.6-2.5 (1H), 2.3 (3H), 1.8-1.2 (39H), FD-MS: m/Z=716 (M$^+$)

Synthesis Example 3

Synthesis of Catalyst (c):

[Chem. 12]

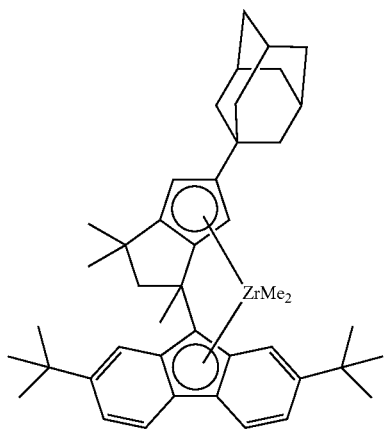

In a nitrogen atmosphere, 15 ml of diethyl ether was added to 0.2 g of catalyst (b) (0.27 mmol), and was cooled to −40° C. 0.21 ml of 3M-methyl magnesium bromide ether solution was added, and the resultant mixture was gradually heated, which was then stirred in room temperature for 48 hours. The reaction solvent was concentrated under reduced pressure, and filtration was performed with hexane. The remaining solvent was concentrated under reduced pressure, and the solids obtained from washing with hexane were concentrated under reduced pressure, thereby obtaining 50 mg of the target compound.

$^1$H-NMR (ppm, CDCl$_3$): 7.9-7.3 (6H), 6.0 (1H), 5.0 (1H), 4.0-3.4 (1H), 2.6-1.2 (43H), −1.1~−1.6 (6H)

Synthesis Example 4

Synthesis of catalyst (d):

[Chem. 13]

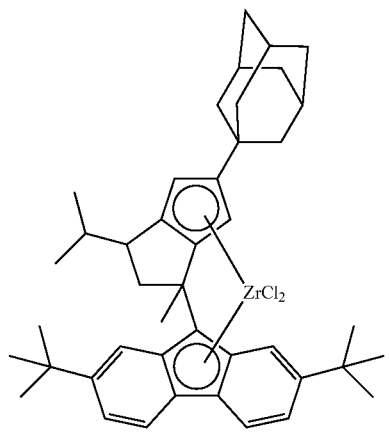

Synthesis Example 4-1

Synthesis of Ligand (d-1)

In a nitrogen atmosphere, a 100 ml three-necked flask was loaded with 682 mg of 2,7-tert-butylfluorene and 25 ml of tert-butyl methyl ether. 1.58 ml of 1.63 M n-butyl lithium hexane solution was added dropwise thereto over 5 minutes, in an ice water bath. The resultant mixture was stirred for 15 minutes in room temperature and 30 minutes at 50° C. After returning the temperature to room temperature, 793 mg of 5-adamantyl-1-isopropyl-3-methyl-1,2-dihydropentalene was further added. After stirring at 50° C. for 17 hours, the separation of organic layer was performed by adding aqueous saturated ammonium chloride solution. The aqueous layer was extracted with diethyl ether. The obtained extract was combined with the previously separated organic layer, and the combined organic layer was washed with aqueous saturated sodium hydrogen carbonate solution, water and aqueous saturated sodium chloride solution. The liquid was dried with magnesium sulfate, and the solvent was evaporated. The solids obtained were washed with methanol, thereby affording 757 mg (yield of 54%) of the target compound. The compound was identified to be the target compound based on the results of the $^1$H-NMR (CDCl$_3$) and FD-MS measurements.

FD-MS: M/Z=572 (M$^+$)

Synthesis Example 4-2

Synthesis of Catalyst (d)

In a nitrogen atmosphere, a 100 ml Schlenk flask was loaded with 750 mg of ligand (d-1), 40 ml of toluene and 1 ml of THF. In an ice water bath, 1.64 ml of 1.63 M n-butyl lithium hexane solution was added dropwise over 5 minutes. The resultant mixture was then stirred at 50° C. for 2 hours. The solvent was evaporated, and 55 ml of hexane was added. In a dry ice methanol cooling bath, 286 mg of ZrCl$_4$ was loaded, and the temperature was slowly returned to room temperature while stirring for 21 hours. Filtration was performed to remove the insolubles, and soluble components were extracted with hexane and dichloromethane. The solvent obtained was then concentrated and washed with hexane, and was extracted using cyclohexane. The solvent was evaporated and dried under reduced pressure, thereby affording the target compound. Amount was 72.9 g and yield was 8.1%. The compound was identified to be the target compound based on the results of the $^1$H-NMR and FD-MS measurements.

$^1$H-NMR (ppm, CDCl$_3$): 8.0 (1H), 7.9 (1H), 7.7 (1H), 7.6 (2H), 7.5 (1H), 6.3 (1H), 5.3 (1H), 3.8-3.7 (1H), 3.0-2.9 (1H), 2.6 (1H), 2.4 (3H), 1.9-1.6 (16H), 1.4 (9H), 1.3 (9H), 1.1-1.0 (6H), FD-MS: m/Z=730 (M$^+$)

[Catalyst 5]

Catalyst (e): dimethyl[3-(tert-butyl)-5-methylcyclopentadienyl] (fluorenyl)zirconium dichloride

[Chem. 14]

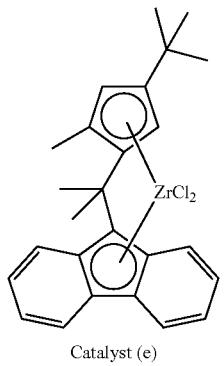

Catalyst (e)

Example 1A

Propylene-1-Butene Binary Copolymer

A Schlenk flask was thoroughly dried and purged with nitrogen, and thereto magnetic stir bars were added, 3.0 μmol (2.26 mg) of the catalyst (a) as a metallocene compound was added, 2.7 mL of heptane was added, the mixture was stirred, and then a 310 eq/cat suspension of modified methyl aluminoxane (0.31 mL of n-hexane solvent, 0.92 mmol in terms of aluminum atoms) was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution of triisobutylaluminum (Al=0.5 M) were loaded. Then, to the resultant mixture, 30 g of 1-butene was added with stirring at 850 RPM, followed by heating to a polymerization temperature of 70° C. At this temperature, nitrogen was added until the autoclave internal pressure became 0.3 MPaG, and the autoclave was further pressurized under propylene until the total pressure became 0.8 MPaG.

The autoclave was fed with the catalyst liquid prepared above, thereby allowing polymerization to be initiated, propylene was supplied such that the total pressure of 0.8 MPaG was maintained until the termination of polymerization, and 15 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 36.8 g of the polymer.

The polymerization activity was 48.5 kg-polymer/mmol-Zr/hr. The obtained polymer had a [η] of 1.84 dl/g, a melting point (Tm) of 99.1° C., a heat of fusion (ΔH) of 50.2 mJ/mg, a crystallization temperature (Tc) of 61.4° C., a weight-average molecular weight (Mw) of 357,000, a number-average molecular weight (Mn) of 164,000, a molecular weight distribution (Mw/Mn) of 2.18, a 1-butene content of 17.6 mol %, and a propylene content of 82.4 mol %.

Example 2A

Propylene-1-Butene Binary Copolymer

The procedures in Example 1A were repeated except that the amount of catalyst was 3.0 μmol and 50 g of 1-butene was supplied, thereby affording the polymer.

Example 3A

Propylene-1-Butene Binary Copolymer

The procedures in Example 1A were repeated except that the amount of catalyst was 3.0 μmol and 60 g of 1-butene was supplied, thereby affording the polymer.

Example 4A

Propylene-1-Butene Binary Copolymer

The procedures in Example 1A were repeated except that the amount of catalyst was 2.0 μmol and 80 g of 1-butene was supplied, thereby affording the polymer.

Example 5A

Propylene-1-Butene Binary Copolymer

The procedures in Example 1A were repeated except that the catalyst type used was the catalyst (b), the amount of catalyst was 4.3 μmol and 30 g of 1-butene was supplied, thereby affording the polymer.

Example 6A

Propylene-1-Butene Binary Copolymer

The procedures in Example 1A were repeated except that the catalyst type used was the catalyst (b), the amount of catalyst was 3.0 μmol and 40 g of 1-butene was supplied, thereby affording the polymer.

Example 7A

Propylene-1-Butene Binary Copolymer

The procedures in Example 1A were repeated except that the catalyst type used was the catalyst (b), the amount of catalyst was 3.0 μmol and 50 g of 1-butene was supplied, thereby affording the polymer.

Example 8A

Propylene-1-Butene Binary Copolymer

The procedures in Example 1A were repeated except that the catalyst type used was the catalyst (c), the amount of catalyst was 3.0 μmol and 40 g of 1-butene was supplied, thereby affording the polymer.

Example 9A

Propylene-1-Butene Binary Copolymer

The procedures in Example 1A were repeated except that the catalyst type used was the catalyst (d), the amount of catalyst was 2.9 μmol and 30 g of 1-butene was supplied, thereby affording the polymer.

Example 10A

Propylene-1-Butene Binary Copolymer

The procedures in Example 1A were repeated except that the catalyst type used was the catalyst (d), the amount of catalyst was 3.0 μmol and 60 g of 1-butene was supplied, thereby affording the polymer.

Comparative Example 1A

Propylene-1-Butene Binary Copolymer

The procedures in Example 1A were repeated except that the catalyst type used was the catalyst (e), the amount of catalyst was 4.3 μmol, 30 g of 1-butene was supplied, and the polymerization time was 20 minutes, thereby affording the polymer.

Comparative Example 2A

Propylene-1-Butene Binary Copolymer

The procedures in Example 1A were repeated except that the catalyst type used was the catalyst (e), the amount of catalyst was 4.3 μmol, 40 g of 1-butene was supplied, and the polymerization time was 20 minutes, thereby affording the polymer.

For Example 1A to 10A and Comparative Examples 1A and 2A, the polymerization conditions and the properties of the obtained 1-butene-based copolymers are shown in Table 5.

Example 11A

Propylene-1-Butene Binary Copolymer

The procedures in Example 1A were repeated except that the catalyst type used was the catalyst (b), the amount of catalyst was 3.0 μmol, 40 g of 1-butene was supplied, and the polymerization temperature was 65° C., thereby affording the polymer.

The polymerization activity was 16.7 kg-polymer/mmol-Zr/hr. The obtained polymer had a [η] of 2.40 dl/g, a melting point (Tm) of 77.9° C., a heat of fusion (ΔH) of 33.9 mJ/mg, a 1-butene content of 20.5 mol %, and a propylene content of 79.5 mol %.

Comparative Example 3A

Propylene-1-Butene Binary Copolymer

The procedures in Example 1A were repeated except that the catalyst type used was the catalyst (e), the amount of catalyst was 5.0 μmol, 40 g of 1-butene was supplied, and the polymerization temperature was 65° C., thereby affording the polymer.

Comparative Example 4A

Propylene-1-Butene Binary Copolymer

The procedures in Example 1A were repeated except that the catalyst type used was the catalyst (e), the amount of catalyst was 5.0 μmol, 50 g of 1-butene was supplied, and the polymerization temperature was 65° C., thereby affording the polymer.

For Example 11 and Comparative Examples 3A and 4A, the polymerization conditions and the properties of the obtained 1-butene-based copolymers are shown in Table 6.

TABLE 5

| No. | Catalyst Type | Activity (kg-polymer/mmol-Zr/hr) | [η] (dl/g) | Tm (° C.) | Tc (° C.) | ΔH (mJ/mg) | Propylene Content mol % | Butene Content mol % |
| --- | --- | --- | --- | --- | --- | --- | --- | --- |
| Example 1A | (a) | 48.5 | 1.84 | 99.1 | 61.4 | 50.2 | 82.4 | 17.6 |
| Example 2A | (a) | 32.1 | 1.84 | 80.6 | — | 35.9 | 74.9 | 25.1 |
| Example 3A | (a) | 40.8 | 1.83 | 75.8 | — | 27.3 | 72.2 | 27.8 |
| Example 4A | (a) | 35.0 | 1.93 | 67.4 | — | 29.2 | 64.4 | 35.6 |
| Example 5A | (b) | 23.8 | 1.76 | 81.4 | — | 44.3 | 78.9 | 21.1 |
| Example 6A | (b) | 26.5 | 1.93 | 71.2 | — | 28.1 | 74.5 | 25.5 |
| Example 7A | (b) | 22.6 | 1.89 | 68.6 | — | 26.9 | 73.1 | 26.9 |
| Example 8A | (c) | 36.1 | 1.74 | 70.9 | — | 29.7 | 74.5 | 25.5 |
| Example 9A | (d) | 66.6 | 1.82 | 100.5 | 55.5 | 51.4 | 83.1 | 16.9 |
| Example 10A | (d) | 69.7 | 1.76 | 76.1 | — | 32.6 | 71.1 | 28.9 |
| Comparative Example 1A | (e) | 12.6 | 1.15 | 70.1 | 23.4 | 30.5 | 71.2 | 28.8 |
| Comparative Example 2A | (e) | 13.2 | 1.19 | 69.1 | 25.0 | 31.4 | 70.0 | 30.0 |

TABLE 6

| | Catalyst Type | Activity (kg-polymer/mmol-Zr/hr) | [η] (dl/g) | Tm (° C.) | Tc (° C.) | ΔH (mJ/mg) | Propylene Content mol % | Butene Content mol % |
|---|---|---|---|---|---|---|---|---|
| Example 11A | (b) | 16.7 | 2.40 | 77.9 | — | 33.9 | 79.5 | 20.5 |
| Comparative Example 3A | (e) | 27.0 | 1.40 | 72.2 | — | 29.3 | 74.3 | 25.7 |
| Comparative Example 4A | (e) | 24.6 | 1.42 | 67.4 | — | 27.1 | 70.2 | 29.8 |

As obvious from the results described in Table 6, it will be recognized that the production method of the present invention promises a significant increase in the molecular weight. Therefore, a significant amount of hydrogen can be added to achieve the same molecular weight, which can lead to the improvement of activity, and hence a 1-butene-based copolymer can be produced at a very high productivity.

Example 1B

Propylene-1-Butene Binary Copolymer

A Schlenk flask was thoroughly dried and purged with nitrogen, and thereto magnetic stir bars were added, 1.07 μmol (0.80 mg) of the catalyst (a) as a metallocene compound was added, and then a 310 eq/cat suspension of modified methyl aluminoxane was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to the resultant mixture, 30 g of 1-butene was added with stirring at 850 RPM, followed by heating to a polymerization temperature of 70° C. At this temperature, nitrogen was added until the autoclave internal pressure became 0.3 MPaG, 35.5 Nml of hydrogen was added, and then the autoclave was further pressurized under propylene until the total pressure became 0.8 MPaG.

The autoclave was fed with the catalyst liquid prepared above, thereby allowing polymerization to be initiated, propylene was supplied such that the total pressure of 0.8 MPaG was maintained until the termination of polymerization, and 10 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 37.6 g of the polymer.

The polymerization activity was 209.9 kg-polymer/mmol-Zr/hr. The obtained polymer had a [η] of 1.68 dl/g, a melting point (Tm) of 99.2° C., a heat of fusion (ΔH) of 50.5 mJ/mg, a crystallization temperature (Tc) of 55.2° C., a propylene content of 81.9 mol %, and a 1-butene content of 18.1 mol %.

Example 2B

Propylene-1-Butene Binary Copolymer

The procedures in Example 1B were repeated except that the amount of catalyst was 0.8 μmol, 60 g of 1-butene was supplied, the polymerization temperature was 70° C., and the polymerization time was 15 minutes, thereby affording the polymer.

Comparative Example 1B

Propylene-1-Butene Binary Copolymer

The procedures in Example 1B were repeated except that the metallocene compound was the catalyst (e) and the amount of catalyst was 1.0 μmol, thereby affording the polymer.

For Examples 1B and 2B and Comparative Example 1B, the polymerization conditions and the properties of the obtained 1-butene-based copolymers are shown in Table 7.

TABLE 7

| No. | Catalyst Type | Activity (kg-polymer/mmol-Zr/hr) | [η] (dl/g) | Tm (° C.) | Tc (° C.) | ΔH (mJ/mg) | Butene Content mol % | Propylene Content mol % |
|---|---|---|---|---|---|---|---|---|
| Example 1B | (a) | 209.9 | 1.68 | 99.2 | 55.2 | 50.5 | 18.1 | 81.9 |
| Example 2B | (a) | 54.1 | 1.69 | 79.5 | — | 34.7 | 27.6 | 72.4 |
| Comparative Example 1B | (e) | 94.4 | 1.24 | 77.6 | 8.1 | 32.2 | 23.2 | 76.8 |

Example 1C

Continuously Loaded Propylene-1-Butene Binary Copolymer

Dehydrated purified hexane at a flow rate of 1.7 liter/hr, a hexane solution at a flow rate of 0.033 liter/hr prepared by mixing with the catalyst (b) at a concentration of 0.1 mmol/liter (preliminarily prepared with 300 eq/cat of methyl aluminoxane (TMAO-341 manufactured by Tosoh Finechem Corporation)), and a hexane solution at a flow rate of 0.2 liter/hr prepared with triisobutylaluminum (TiBA manufactured by Tosoh Finechem Corporation) at a concentration of 5 mmol/liter were continuously supplied into one of the supply ports of a 1-liter volume pressurized continuous polymerization reactor with stirring blades which had been thoroughly purged with nitrogen. At the same time, propylene at a flow rate of 0.42 kg/hr, 1-butene at a flow rate of 0.24 kg/hr and hydrogen at a flow rate of 0.080 normal liter/hr were continuously supplied into another supply port of the continuous polymerization reactor, and a continuous solution polymerization was performed under the conditions of a polymerization temperature of 70° C., a total pressure of 3.6 MPa-G and the number of revolutions for stirring of 700 RPM. The heat of polymerization reaction was removed by passing coolant through the jacket attached onto the outer periphery of the polymerization reactor. The hexane solution containing a propylene-1-butene copolymer produced as the result of the polymerization performed under the above-described conditions was continuously discharged as a propylene-1-butene copolymer at a speed of 0.20 kg/hr through an outlet provided in the polymerization reactor such that the average pressure of 3.6 MPa-G was maintained in the polymerization reactor. The obtained polymerization solution was discharged into a large amount of methanol to precipitate a propylene-1-butene copolymer, which was then dried under reduced pressure at 130° C. for 2 hours, thereby affording the polymer.

The polymerization activity was 197 kg-polymer/mmol-Zr/hr. The obtained polymer had an MFR of 5.90 g/10 minutes, a [η] of 1.90 dl/g, a melting point (Tm) of 73.9° C., a 1-butene content of 23.0 mol %, and a propylene content of 77.0 mol %.

Example 2C

Continuously Loaded Propylene-1-Butene Binary Copolymer

A hexane solution at a flow rate of 0.019 liter/hr prepared by mixing with the catalyst (b) at a concentration of 0.1 mmol/liter (preliminarily prepared with 300 eq/cat of methyl aluminoxane (TMAO-341 manufactured by Tosoh Finechem Corporation)), and a hexane solution at a flow rate of 0.2 liter/hr prepared with triisobutylaluminum (TiBA manufactured by Tosoh Finechem Corporation) at a concentration of 5 mmol/liter were continuously supplied. Except that at the same time, propylene at a flow rate of 0.45 kg/hr, 1-butene at a flow rate of 0.17 kg/hr and hydrogen at a flow rate of 0.110 normal liter/hr were continuously supplied into another supply port of the continuous polymerization reactor, the procedures in Example 1C were repeated, thereby affording the polymer.

Example 3C

Continuously Loaded Propylene-1-Butene Binary Copolymer

A hexane solution at a flow rate of 0.016 liter/hr prepared by mixing with the catalyst (b) at a concentration of 0.1 mmol/liter (preliminarily prepared with 300 eq/cat of methyl aluminoxane (TMAO-341 manufactured by Tosoh Finechem Corporation)), and a hexane solution at a flow rate of 0.2 liter/hr prepared with triisobutylaluminum (TiBA manufactured by Tosoh Finechem Corporation) at a concentration of 5 mmol/liter were continuously supplied. Except that at the same time, propylene at a flow rate of 0.457 kg/hr, 1-butene at a flow rate of 0.096 kg/hr and hydrogen at a flow rate of 0.120 normal liter/hr were continuously supplied into another supply port of the continuous polymerization reactor, the procedures in Example 1C were repeated, thereby affording the polymer.

Example 4C

Continuously Loaded Propylene-1-Butene Binary Copolymer

A hexane solution at a flow rate of 0.016 liter/hr prepared by mixing with the catalyst (b) at a concentration of 0.1 mmol/liter (preliminarily prepared with 300 eq/cat of methyl aluminoxane (TMAO-341 manufactured by Tosoh Finechem Corporation)) and a hexane solution at a flow rate of 0.09 liter/hr prepared with triisobutylaluminum (TiBA manufactured by Tosoh Finechem Corporation) at a concentration of 5 mmol/liter were continuously supplied. Except that the polymerization temperature was 65° C. and that at the same time, propylene at a flow rate of 0.495 kg/hr, 1-butene at a flow rate of 0.264 kg/hr and hydrogen at a flow rate of 0.100 normal liter/hr were continuously supplied into another supply port of the continuous polymerization reactor, the procedures in Example 1C were repeated, thereby affording the polymer.

Example 5C

Continuously Loaded Propylene-1-Butene Binary Copolymer

The catalyst used was the catalyst (a), and a hexane solution at a flow rate of 0.032 liter/hr prepared by mixing with the catalyst at a concentration of 0.1 mmol/liter (preliminarily prepared with 300 eq/cat of methyl aluminoxane (TMAO-341 manufactured by Tosoh Finechem Corporation)) and a hexane solution at a flow rate of 0.09 liter/hr prepared with triisobutylaluminum (TiBA manufactured by Tosoh Finechem Corporation) at a concentration of 5 mmol/liter were continuously supplied. Except that at the same time, propylene at a flow rate of 0.449 kg/hr, 1-butene at a flow rate of 0.393 kg/hr and hydrogen at a flow rate of 0.070 normal liter/hr were continuously supplied into another supply port of the continuous polymerization reactor, the procedures in Example 1C were repeated, thereby affording the polymer.

Example 6C

Continuously Loaded Propylene-1-Butene Binary Copolymer

A hexane solution at a flow rate of 0.050 liter/hr prepared by mixing with the catalyst (b) at a concentration of 0.1 mmol/liter (preliminarily prepared with 300 eq/cat of methyl aluminoxane (TMAO-341 manufactured by Tosoh Finechem Corporation)) and a hexane solution at a flow rate of 0.09 liter/hr prepared with triisobutylaluminum (TiBA manufactured by Tosoh Finechem Corporation) at a concentration of 5 mmol/liter were continuously supplied. Except that the polymerization temperature was 65° C. and that at the same time, propylene at a flow rate of 0.423 kg/hr, 1-butene at a flow rate of 0.336 kg/hr and hydrogen at a flow rate of 0.055 normal liter/hr were continuously supplied into another supply port of the continuous polymerization reactor, the procedures in Example 1C were repeated, thereby affording the polymer.

Comparative Example 1C

Continuously Loaded Propylene-1-Butene Binary Copolymer

Except that the catalyst used was the catalyst (e) and that the catalyst (e) at a concentration of 0.3 mmol/liter and a hexane solution at a flow rate of 0.026 liter/hr prepared by mixing with triisobutylaluminum (TiBA manufactured by Tosoh Finechem Corporation) at a concentration of 60 mmol/liter were continuously supplied, the procedures in Example 6C were repeated, thereby affording the polymer.

For Examples 1C to 6C and Comparative Example 1C, the production conditions and the properties of the obtained 1-butene-based copolymers are shown in Table 8.

TABLE 8

| No. | Catalyst Type | Polymerization Temperature (° C.) | Flow Propylene/ 1-Butene Ratio | Flow Hydrogen (NL/hr) | Activity (kg-polymer/mmol-Zr/hr) | Melting Point (° C.) | [η] (dl/g) | MFR g/10 min | Butene Content (mol %) | Propylene Content (mol %) |
|---|---|---|---|---|---|---|---|---|---|---|
| Example 1C | (b) | 70 | 1.7 | 0.080 | 197 | 73.9 | 1.90 | 5.90 | 23.0 | 77.0 |
| Example 2C | (b) | 70 | 2.6 | 0.110 | 391 | 86.6 | 1.77 | 8.30 | 17.5 | 82.5 |
| Example 3C | (b) | 70 | 4.8 | 0.120 | 418 | 95.5 | 1.78 | 8.30 | 14.3 | 85.7 |
| Example 4C | (b) | 65 | 1.9 | 0.100 | 497 | 74.9 | 1.76 | 8.50 | 21.9 | 78.1 |
| Example 5C | (a) | 70 | 1.1 | 0.070 | 275 | 70.9 | 1.90 | 5.60 | 28.1 | 71.9 |
| Example 6C | (b) | 65 | 1.3 | 0.055 | 138 | 65.2 | 2.33 | 2.60 | 28.3 | 71.7 |
| Comparative Example 1C | (e) | 65 | 1.3 | 0.055 | 95 | 75.7 | 1.35 | 7.40 | 29.6 | 70.4 |

Example 1D

Propylene-1-Butene-Ethylene Ternary Copolymer

A Schlenk flask was thoroughly dried and purged with nitrogen, and thereto magnetic stir bars were added, 0.5 μmol of the catalyst (b) as a metallocene compound was added, and then a 300 eq/cat suspension of modified methyl aluminoxane (n-hexane solvent) was added with stirring at room temperature, to give a catalyst liquid.

In a 1500 ml-volume SUS autoclave that had been thoroughly dried and purged with nitrogen, 500 ml of heptane as a polymerization solvent and 0.5 mmol of hexane solution (Al=0.5 M) of triisobutylaluminum were loaded. Then, to the resultant mixture, 50 g of 1-butene was added with stirring at 850 RPM, followed by heating to a polymerization temperature of 55° C. Propylene was added until the autoclave differential pressure became 0.58 MPaG, nitrogen was added until the internal pressure became 0.7 MPaG, and the autoclave was further pressurized under ethylene until the total pressure became 0.75 MPaG.

The autoclave was fed with the catalyst liquid prepared above, thereby allowing polymerization to be initiated, ethylene was supplied such that the total pressure of 0.75 MPaG was maintained until the termination of polymerization, and 25 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 36.6 g of the polymer.

Comparative Example 1D

Propylene-1-Butene-Ethylene Ternary Copolymer

The procedures in Example 1D were repeated except that the metallocene compound was changed to the catalyst (e), thereby affording the polymer.

For Example 1D and Comparative Example 1D, the properties of the obtained 1-butene-based copolymers are shown in Table 9.

Example 1E

1-Butene-Propylene Binary Copolymer

A Schlenk flask was thoroughly dried and purged with nitrogen, and thereto magnetic stir bars were added, 1.5 μmol of the catalyst (b) as a metallocene compound was added, and then a 310 eq/cat suspension of modified methyl aluminoxane was added with stirring at room temperature, to prepare a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were added. Then, to the resultant mixture, 180 g of 1-butene was added with stirring at 850 RPM, followed by heating to a polymerization temperature of 60° C. At this temperature, nitrogen was added until the autoclave internal pressure became 0.6 MPaG, 35.5 Nml of hydrogen was added, and then the autoclave was further pressurized under propylene until the total pressure became 0.7 MPaG.

The autoclave was fed with the catalyst liquid prepared above, thereby allowing polymerization to be initiated, propylene was supplied such that the total pressure of 0.7 MPaG was maintained until the termination of polymerization, and 20 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 80.1 g of the polymer.

TABLE 9

| No. | Catalyst Type | Activity (kg-polymer/mmol-Zr/hr) | Tm (° C.) | [η] (dl/g) | Butene Content (mol %) | Propylene Content (mol %) | Ethylene Content (mol %) |
|---|---|---|---|---|---|---|---|
| Example 1D | (b) | 87.8 | not observed | 1.75 | 21.1 | 66.1 | 12.8 |
| Comparative Example 1D | (e) | 34.8 | not observed | 1.47 | 30.1 | 59.4 | 10.5 |

The polymerization activity was 158.6 kg-polymer/mmol-Zr/hr. The obtained polymer had a [η] of 1.70 dl/g, a melting point (Tm) of 104.1° C., a heat of fusion (ΔH) of 49.2 mJ/mg, a propylene content of 8.3 mol %, and a 1-butene content of 91.7 mol %.

Example 2E

1-Butene-Propylene Binary Copolymer

The procedures in Example 1E were repeated except that the internal pressure was brought to 0.55 MPa with nitrogen, hydrogen was not used, and then propylene was charged to give a total pressure of 0.7 MPa, a polymerization temperature of 60° C., and a polymerization time of 20 minutes, thereby affording 7.9 g of the polymer.

Comparative Example 1E

1-Butene-Propylene Binary Copolymer

The procedures in Example 2E were repeated except that the metallocene compound was changed to the catalyst (e), and the suspension of modified methyl aluminoxane was used at 300 eq/cat, thereby affording the polymer.

For Examples 1E and 2E and Comparative Example 1E, the polymerization conditions and the properties of the obtained 1-butene-based copolymers are shown in Table 10.

the resultant mixture, 50 g of 1-butene was added with stirring at 850 RPM, followed by heating to a polymerization temperature of 60° C. At this temperature, nitrogen was added until the autoclave internal pressure became 0.77 MPaG, and the autoclave was further pressurized under ethylene until the total pressure became 0.8 MPaG.

The autoclave was fed with the catalyst liquid prepared above, thereby allowing polymerization to be initiated, ethylene was supplied such that the total pressure of 0.8 MPaG was maintained until the termination of polymerization, and 15 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 2.8 g of the polymer.

The polymerization activity was 5.6 kg-polymer/mmol-Zr/hr. The obtained polymer had a [η] of 1.35 dl/g, and no melting point (Tm) was observed. The 1-butene content was 93.8 mol % and the ethylene content was 6.2 mol %.

TABLE 10

| No. | Catalyst Type | Hydrogen (Nm/L) | Activity (kg-polymer/mmol-Zr/hr) | [η] (dl/g) | Tm (° C.) | ΔH (mJ/mg) | Butene Content (mol %) | Propylene Content (mol %) |
|---|---|---|---|---|---|---|---|---|
| Example 1E | (b) | 35.5 | 158.6 | 1.70 | 104.1 | 49.2 | 91.7 | 8.3 |
| Example 2E | (b) | 0 | 15.5 | 1.93 | 95.7 | 23.3 | 78.1 | 21.9 |
| Comparative Example 1E | (e) | 0 | 5.2 | 1.79 | 98.4 | 43.7 | 80.1 | 19.9 |

Example 1F

1-Butene-Ethylene Binary Copolymer

A Schlenk flask was thoroughly dried and purged with nitrogen, and thereto magnetic stir bars were added, 2.0 μmol of the catalyst (b) as a metallocene compound was added, and then a 310 eq/cat suspension of modified methyl aluminoxane was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to Comparative Example 1F 1-Butene-Ethylene Binary Copolymer The procedures in Example 1F were repeated except that the metallocene compound used was changed to the catalyst (e), thereby affording the polymer.

For Example 1F and Comparative Example 1F, the polymerization conditions and the properties of the obtained 1-butene-based (co)polymers are shown in Table 11.

TABLE 11

| No. | Catalyst Type | Activity (kg-polymer/mmol-Zr/hr) | Melting Point (° C.) | [η] (dl/g) | Butene Content (mol %) | Ethylene Content (mol %) |
|---|---|---|---|---|---|---|
| Example 1F | (b) | 5.6 | not observed | 1.35 | 93.8 | 6.2 |
| Comparative Example 1F | (e) | 0.8 | not observed | 1.05 | 91.0 | 9.0 |

Example 1G

1-Butene Polymer

A Schlenk flask was thoroughly dried and purged with nitrogen, and thereto magnetic stir bars were added, 2.0 μmol of the catalyst (b) as a metallocene compound was added, and then a 310 eq/cat suspension of modified methyl aluminoxane was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to the resultant mixture, 180 g of 1-butene was added with stirring at 850 RPM, followed by heating to a polymerization temperature of 60° C. At this temperature, the autoclave was pressurized under nitrogen until the internal pressure became 0.5 MPaG.

This autoclave was fed with the catalyst liquid prepared above, thereby allowing polymerization to be initiated, and 20 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 1.6 g of the polymer.

The polymerization activity was 2.4 kg-polymer/mmol-Zr/hr. The obtained polymer had a [η] of 1.75 dl/g, melting points (Tm) of 99.9° C. and 117.4° C., heats of fusion (ΔH) of 28.1 mJ/mg and 2.73 mJ/mg, and a crystallization temperature (Tc) of 64.0° C.

After stabilization of crystal, the melting point (Tm) was 115.8° C., and the heat of fusion (ΔH) was 51.5 mJ/mg.

Example 2G

1-Butene Polymer

A Schlenk flask was thoroughly dried and purged with nitrogen, and thereto magnetic stir bars were added, 2.0 μmol of the catalyst (b) as a metallocene compound was added, and then a 300 eq/cat suspension of modified methyl aluminoxane was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to the resultant mixture, 180 g of 1-butene was added with stirring at 850 RPM, followed by heating to a polymerization temperature of 60° C. After 17.8 Nml of hydrogen was added, at this temperature, the autoclave was pressurized under nitrogen until the internal pressure became 0.5 MPaG.

This autoclave was fed with the catalyst liquid prepared above, thereby allowing polymerization to be initiated, and 10 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 42.5 g of the polymer.

Comparative Example 1G

1-Butene Polymer

A Schlenk flask was thoroughly dried and purged with nitrogen, and thereto magnetic stir bars were added, 4.4 μmol of the catalyst (e) as a metallocene compound was added, and then a 310 eq/cat suspension of modified methyl aluminoxane (n-hexane solvent) was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to the resultant mixture, 180 g of 1-butene was added with stirring at 850 RPM, followed by heating to a polymerization temperature of 60° C. At this temperature, nitrogen was added until the autoclave internal pressure became 0.5 MPaG.

This autoclave was fed with the catalyst liquid prepared above, thereby allowing polymerization to be initiated, and 20 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 4.2 g of the polymer.

The polymerization activity was 2.9 kg-polymer/mmol-Zr/hr. The obtained polymer had a [η] of 1.33 dl/g and a crystallization temperature (Tc) of 72.8° C.

After stabilization of crystal, the melting point (Tm) was 120.7° C., and the heat of fusion (ΔH) was 67.0 mJ/mg.

Comparative Example 2G

1-Butene Polymer

A Schlenk flask was thoroughly dried and purged with nitrogen, and thereto magnetic stir bars were added, 2.0 μmol of the catalyst (e) as a metallocene compound was added, and then a 300 eq/cat suspension of modified methyl aluminoxane was added with stirring at room temperature, to give a catalyst liquid.

In a 1500 ml-volume SUS autoclave that had been thoroughly dried and purged with nitrogen, 500 ml of heptane as a polymerization solvent and 0.75 mmol of hexane solution (Al=0.5 M) of triisobutylaluminum were loaded. Then, to the resultant mixture, 180 g of 1-butene was added with stirring at 850 RPM, followed by heating to a polymerization temperature of 60° C. After 17.8 Nml of hydrogen was added, at this temperature, the autoclave was pressurized under nitrogen until the internal pressure became 0.5 MPaG.

This autoclave was fed with the catalyst liquid prepared above, thereby allowing polymerization to be initiated, and 20 minutes after the initiation, methanol was added to terminate the polymerization.

The autoclave was cooled and depressurized, and the resultant polymerization liquid was taken out of the autoclave and charged into a 1:1 solution of acetone and methanol to precipitate a polymer, which was recovered by filtration. The polymer obtained was dried under reduced pressure at 80° C. for 10 hours, thereby affording 3.6 g of the polymer.

Comparative Example 3G

1-Butene Polymer

The procedures in Comparative Example 2G were repeated except that the amount of hydrogen used was changed to 42.6 Nml, thereby affording the polymer.

For Examples 1G and 2G and Comparative Examples 1G, 2G and 3G, the polymerization conditions and the properties of the obtained 1-butene-based copolymers are shown in Table 12.

TABLE 12

| No. | Catalyst Type | Hydrogen (NmL) | Activity (kg-polymer/mmol-Zr/hr) | Melting Point (° C.) | Heat of Fusion (mJ/mg) | Crystallization Temperature (° C.) | After Stabilization of Crystal Melting Point (° C.) | Heat of Fusion (mJ/mg) | [η] (dl/g) |
|---|---|---|---|---|---|---|---|---|---|
| Example 1G | (b) | 0.0 | 2.4 | 99.9 117.4 | 28.1 2.73 | 64.0 | 115.8 | 51.5 | 1.75 |
| Example 2G | (b) | 17.8 | 127.4 | 99.5 114.6 | 30.7 2.24 | 55.6 | 115.5 | 59.7 | 1.09 |
| Comparative Example 1G | (e) | 0.0 | 2.9 | — | — | 72.8 | 120.7 | 67.0 | 1.33 |
| Comparative Example 2G | (e) | 17.8 | 5.4 | 102.5 117.7 | 29.9 2.31 | 59.4 | 117.2 | 64.4 | 1.20 |
| Comparative Example 3G | (e) | 42.6 | 108.3 | 102.0 117.7 | 31.7 1.98 | 61.4 | 117.5 | 69.4 | 1.12 |

As obvious from the results described in Table 12, it will be recognized that, according to the production method of the present invention, a significant increase in the molecular weight can be expected. In addition, the addition of hydrogen can improve the activity significantly, and hence a 1-butene-based copolymer can be produced at a very high productivity.

As obvious also from FIG. 1, according to the present invention, an olefin (co)polymer that has a high molecular weight and contains structural units derived from 1-butene can be obtained with a high activity and hence can be produced at a very high productivity.

The invention claimed is:

1. A production method of an olefin copolymer containing structural units derived from 1-butene, comprising
a step of copolymerizing at least a 1-butene and a propylene, optionally an α-olefin having 2 or more carbon atoms (excluding 1-butene and propylene) and optionally (an)other monomer(s) under the conditions of a polymerization temperature of not less than 55° C. and not more than 200° C. and a polymerization pressure of not less than 0.1 MPaG and not more than 5.0 MPaG in the presence of an olefin polymerization catalyst containing
(A) a crosslinked metallocene compound represented by General Formula [I] below, and
(B) at least one compound selected from
(b-1) an organoaluminum oxy-compound,
(b-2) a compound that forms an ion pair by reacting with the crosslinked metallocene compound (A), and
(b-3) an organoaluminum compound;
wherein the olefin copolymer includes at least structural units derived from 1-butene, includes the total content of structural units derived from ethylene and an α-olefin having 4 or more carbon atoms (including 1-butene) in the range of not less than 8 mol % and not more than 50 mol %, and includes the content of structural units derived from propylene in the range of not less than 50 mol % and not more than 92 mol % (provided that the total of the content of structural units derived from ethylene and the α-olefin having 4 or more carbon atoms (including 1-butene) and the content of structural units derived from propylene is 100 mol %), and
wherein a peak melting point (Tm) obtained from the differential scanning calorimetry (DSC) is not less than 50° C. and less than 110° C., or the peak melting point is not observed from DSC,

[Chem. 1]

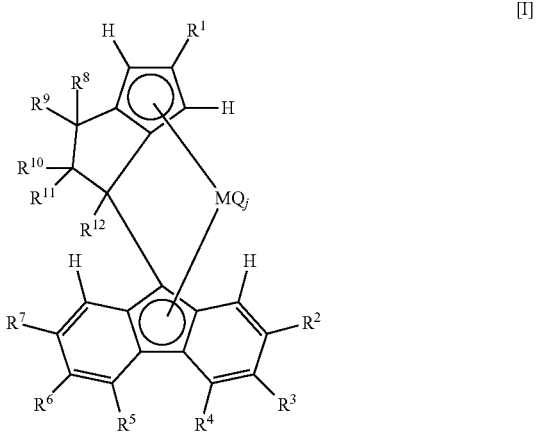

[I]

(In the formula, $R^1$ is an adamantyl group derivative; $R^2$ and $R^7$ are selected from a hydrocarbon group, a silicon-containing group, and a halogen-containing hydrocarbon group; $R^3$ and $R^6$ are hydrogen atoms; $R^4$, $R^5$, $R^8$, $R^9$, $R^{10}$, $R^{11}$, and R are selected from a hydrogen atom, a hydrocarbon group, a silicon-containing group, a halogen atom, and a halogen-containing hydrocarbon group and may be the same or different from each other, and adjacent substituents among $R^4$, $R^5$, $R^8$, $R^9$, $R^{10}$, $R^{11}$, and $R^{12}$ may combine to form a ring; M is a Group 4 transition metal; Q is a halogen atom, a hydrocarbon group, an anionic ligand, or a neutral ligand that is bondable with a lone pair and may be the same or different from each other; and j is an integer between 1 and 4).

2. The production method of an olefin copolymer containing structural units derived from 1-butene according to claim 1, wherein in General Formula [I], $R^1$ is a 1-adamantyl group.

3. The production method of an olefin copolymer containing structural units derived from 1-butene according to claim 1, wherein in General Formula [I], $R^2$ and $R^7$ are hydrocarbon groups having 4 to 10 carbon atoms.

4. The production method of an olefin copolymer containing structural units derived from 1-butene according to claim 1, wherein in General Formula [I], $R^4$ and $R^5$ are hydrogen atoms.

5. The production method of an olefin copolymer containing structural units derived from 1-butene according to claim 1, wherein in General Formula [I], $R^{12}$ is a hydrocarbon group having 1 to 20 carbon atoms.

6. The production method of an olefin copolymer containing structural units derived from 1-butene according to claim 1, wherein in General Formula [I], $R^8$ to $R^{11}$ are hydrogen atoms or hydrocarbon groups having 1 to 20 carbon atoms.

7. The production method of an olefin copolymer containing structural units derived from 1-butene according to claim 1, wherein in General Formula [I], $R^{10}$ and $R^{11}$ are hydrogen atoms.

8. The production method of an olefin copolymer containing structural units derived from 1-butene according to claim 1, wherein in General Formula [I], $R^8$ and $R^9$ are hydrocarbon groups having 1 to 20 carbon atoms.

9. The production method of an olefin copolymer containing structural units derived from 1-butene according to claim 1, wherein copolymerization is performed in the presence of hydrogen.

10. The production method of an olefin copolymer containing structural units derived from 1-butene according to claim 1,
wherein the olefin copolymer is obtained by copolymerization of at least a 1-butene and propylene and optionally (an)other monomer(s), and satisfies both of the requirements (i) and (ii) below:
(i) the structural units derived from propylene (P) are 51 mol % ≤P ≤90 mol %, and the structural units derived from 1-butene (B) are 10 mol % ≤B ≤49 mol % (provided that (P) +(B) =100 mol %), and
(ii) the intrinsic viscosity [η] in decalin at 135° C. is 1.3 (dl/g) ≤[η] ≤10 (dl/g).

11. The production method of an olefin copolymer containing structural units derived from 1-butene according to claim 1,
wherein the olefin copolymer is obtained by copolymerization of at least a 1-butene, propylene and ethylene and optionally (an)other monomer(s), and satisfies both of the requirements (i) and (ii) below:
(i) the structural units derived from propylene (P) are 51 mol % ≤P ≤92 mol %, the structural units derived from 1-butene (B) are 4 mol % ≤B ≤45 mol %, and the structural units derived from ethylene (E) are 4 mol % ≤E ≤45 mol % (provided that (P) +(B) +(E) =100 mol %), and
(ii) the intrinsic viscosity [η] in decalin at 135° C. is 1.3 (dl/g) ≤[η] ≤10 (dl/g).

12. A production method of an olefin (co)polymer containing structural units derived from 1-butene, comprising
a step of (co)polymerizing at least a 1-butene, optionally an α-olefin having 2 or more carbon atoms (excluding 1-butene) and optionally (an)other monomer(s) under the conditions of a polymerization temperature of not less than 55° C. and not more than 200° C. and a polymerization pressure of not less than 0.1 MPaG and not more than 5.0 MPaG in the presence of an olefin polymerization catalyst containing
(A) a crosslinked metallocene compound represented by General Formula [I] below, and
(B) at least one compound selected from
(b-1) an organoaluminum oxy-compound,
(b-2) a compound that forms an ion pair by reacting with the crosslinked metallocene compound (A), and
(b-3) an organoaluminum compound;
wherein the olefin (co)polymer includes at least structural units derived from 1-butene, includes the content of structural units derived from 1-butene in the range of more than 50 mol % and 100 mol % or less, and includes the total content of structural units derived from an α-olefin having 2 or more carbon atoms (excluding 1-butene) in the range of 0 mol % or more and less than 50 mol % (provided that the total of the content of structural units derived from 1-butene and the content of structural units derived from the α-olefin having 2 or more carbon atoms (excluding 1-butene) is 100 mol %),

[Chem. 2]

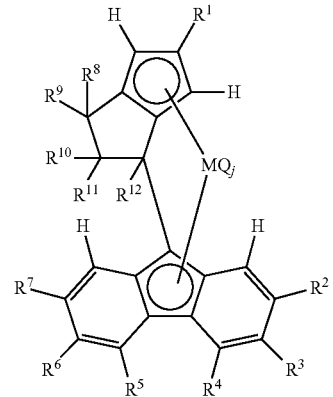

[I]

(In the formula, $R^1$ is an adamantyl group derivative; $R^2$ and $R^7$ are selected from a hydrocarbon group, a silicon-containing group, and a halogen-containing hydrocarbon group; $R^3$ and $R^6$ are hydrogen atoms; $R^4$, $R^5$, $R^8$, $R^9$, $R^{10}$, $R^{11}$, and $R^{12}$ are selected from a hydrogen atom, a hydrocarbon group, a silicon-containing group, a halogen atom, and a halogen-containing hydrocarbon group and may be the same or different from each other, and adjacent substituents among $R^4$, $R^5$, $R^8$, $R^9$, $R^{10}$, $R^{11}$, and $R^{12}$ may combine to form a ring; M is a Group 4 transition metal; Q is a halogen atom, a hydrocarbon group, an anionic ligand, or a neutral ligand that is bondable with a lone pair and may be the same or different from each other; and j is an integer between 1 and 4).

13. The production method of an olefin (co)polymer containing structural units derived from 1-butene according to claim 12, wherein in General Formula [I], $R^1$ is a 1-adamantyl group.

14. The production method of an olefin (co)polymer containing structural units derived from 1-butene according to claim 12, wherein in General Formula [I], $R^2$ and $R^7$ are hydrocarbon groups having 4 to 10 carbon atoms.

15. The production method of an olefin (co)polymer containing structural units derived from 1-butene according to claim 12, wherein in General Formula [I], $R^4$ and $R^5$ are hydrogen atoms.

16. The production method of an olefin (co)polymer containing structural units derived from 1-butene according to claim 12, wherein in General Formula [I], $R^{12}$ is a hydrocarbon group having 1 to 20 carbon atoms.

17. The production method of an olefin (co)polymer containing structural units derived from 1-butene according to claim 12, wherein in General Formula [I], $R^8$ to $R^{11}$ are hydrogen atoms or hydrocarbon groups having 1 to 20 carbon atoms.

18. The production method of an olefin (co)polymer containing structural units derived from 1-butene according to claim 12, wherein in General Formula [I], $R^{10}$ and $R^{11}$ are hydrogen atoms.

19. The production method of an olefin (co)polymer containing structural units derived from 1-butene according to claim 12, wherein in General Formula [I], $R^8$ and $R^9$ are hydrocarbon groups having 1 to 20 carbon atoms.

20. The production method of an olefin (co)polymer containing structural units derived from 1-butene according to claim 12, wherein (co)polymerization is performed in the presence of hydrogen.

21. The production method of an olefin (co)polymer containing structural units derived from 1-butene according to claim 12, wherein a peak melting point (Tm) obtained from differential scanning calorimetry (DSC) of the olefin (co)polymer is not less than 50° C. and less than 130° C., or the peak melting point is not observed from DSC.

22. The production method of an olefin copolymer containing structural units derived from 1-butene according to claim 12,
wherein the olefin (co)polymer is obtained by copolymerization of at least a 1-butene and propylene and optionally (an)other monomer(s), and satisfies both of the requirements (i) and (ii) below:
(i) structural units derived from 1-butene (B) are 51 mol % ≤B ≤95 mol %, and structural units derived from propylene (P) are 5 mol % ≤P ≤49 mol % (provided that (B) +(P) =100 mol %), and
(ii) an intrinsic viscosity [η] in decalin at 135° C. is 1.3 (dl/g) ≤[η] ≤10 (dl/g).

23. The production method of an olefin copolymer containing structural units derived from 1-butene according to claim 12,
wherein the olefin (co)polymer is obtained by copolymerization of at least a 1-butene and ethylene and optionally (an)other monomer(s), and satisfies both of the requirements (i) and (ii) below:
(i) the structural units derived from 1-butene (B) are 51 mol % ≤B ≤95 mol %, and structural units derived from ethylene (E) are 5 mol % ≤E ≤49 mol % (provided that (B) +(E) =100 mol %), and
(ii) the intrinsic viscosity [η] in decalin at 135° C. is 1.3 (dl/g) ≤[η] ≤10 (dl/g).

24. The production method of an olefin copolymer containing structural units derived from 1-butene according to claim 1,
wherein a 1-butene and an α-olefin having 2 or more carbon atoms (excluding 1-butene) are supplied to a polymerization reaction system continuously or intermittently while satisfying the requirement (i) below:
(i) the supply ratio of 1-butene (B) to α-olefin having 2 or more carbon atoms (excluding 1-butene) (O) (molar ratio, B/O) is 1/1000 ≤(B/O) ≤1000/1, wherein the α-olefin having 2 or more carbon atoms (excluding 1-butene) is in the total amount (total molar amount) of the α-olefins having 2 or more carbon atoms supplied for polymerization reaction other than 1-butene.

25. The production method of an olefin copolymer containing structural units derived from 1-butene according to claim 24, wherein hydrogen is supplied to a copolymerization reaction system continuously or intermittently while satisfying the requirements (ii) and (iii) below, and copolymerization is performed in the presence of hydrogen:
(ii) the supply amount of hydrogen (H) is 0.001 normal liter/hr ≤H ≤1000 normal liter/hr, and
(iii) the olefin polymerization activity is not less than 100 kg-polymer/mmol-M/hr and not more than 50000 kg-polymer/mmol-M/hr.

* * * * *

UNITED STATES PATENT AND TRADEMARK OFFICE
CERTIFICATE OF CORRECTION

PATENT NO. : 9,944,728 B2
APPLICATION NO. : 15/509382
DATED : April 17, 2018
INVENTOR(S) : Ikuko Ebisawa et al.

Page 1 of 1

It is certified that error appears in the above-identified patent and that said Letters Patent is hereby corrected as shown below:

In the Claims

Claim 1, Column 66, Line 57:
Please delete "$R^5$, $R^8$, $R^9$, $R^{10}$, $R^{11}$, and R".
Please insert -- $R^5$, $R^8$, $R^9$, $R^{10}$, $R^{11}$, and $R^{12}$ --.

Signed and Sealed this
Ninth Day of April, 2019

Andrei Iancu
*Director of the United States Patent and Trademark Office*